(12) United States Patent
Graves et al.

(10) Patent No.: US 7,066,191 B2
(45) Date of Patent: Jun. 27, 2006

(54) INSTALLATION FOR MAKING AVAILABLE HIGHLY PURE FINE CHEMICALS

(75) Inventors: Todd Graves, Phoenix, AZ (US); Martin Vondran, Stockstadt (DE); Martin Benzinger, Michelstadt (DE)

(73) Assignee: Kinetics Germany GmbH, Eschau-Hobbach (DE)

( * ) Notice: Subject to any disclaimer, the term of this patent is extended or adjusted under 35 U.S.C. 154(b) by 410 days.

(21) Appl. No.: 10/413,509

(22) Filed: Apr. 14, 2003

(65) Prior Publication Data

US 2004/0069347 A1 Apr. 15, 2004

(30) Foreign Application Priority Data

Apr. 12, 2002 (DE) .................... 202 05 819 U

(51) Int. Cl.
*B08B 7/00* (2006.01)

(52) U.S. Cl. .................. 137/15.01; 137/377; 137/382; 118/728

(58) Field of Classification Search ................ 137/377, 137/382, 15.01; 118/728
See application file for complete search history.

(56) References Cited

U.S. PATENT DOCUMENTS

| | | | |
|---|---|---|---|
| 4,059,929 A | 11/1977 | Bishop | |
| 4,242,841 A | 1/1981 | Ushakov et al. | |
| 4,327,759 A | 5/1982 | Millis | |
| 4,439,042 A | 3/1984 | Bertoglio | |
| 4,625,627 A * | 12/1986 | Livanos et al. | 454/237 |
| 4,642,222 A | 2/1987 | Brazelton | |
| 4,654,802 A | 3/1987 | Davis | |
| 4,764,019 A | 8/1988 | Kaminski et al. | |
| 4,964,732 A | 10/1990 | Cadeo et al. | |
| 5,255,821 A | 10/1993 | Hall et al. | |
| 5,271,521 A | 12/1993 | Noss et al. | |
| 5,332,125 A | 7/1994 | Schmitkons et al. | |
| 5,372,421 A | 12/1994 | Pardikes | |
| 5,407,526 A | 4/1995 | Danielson et al. | |
| 5,423,607 A | 6/1995 | Jones et al. | |
| 5,478,435 A | 12/1995 | Murphy et al. | |
| 5,584,959 A | 12/1996 | Kimura et al. | |
| 5,634,715 A | 6/1997 | Stehr et al. | |
| 5,641,410 A | 6/1997 | Peltzer | |
| 5,750,440 A | 5/1998 | Vanell et al. | |
| 5,823,219 A | 10/1998 | Purvis | |
| 5,993,671 A | 11/1999 | Peltzer | |
| 6,048,256 A | 4/2000 | Obeng et al. | |
| 6,105,606 A | 8/2000 | Jackson | |
| 6,113,694 A * | 9/2000 | Davis | 118/663 |
| 6,199,599 B1 | 3/2001 | Gregg et al. | |
| 6,217,659 B1 | 4/2001 | Botelho et al. | |
| 6,224,778 B1 | 5/2001 | Peltzer | |

(Continued)

FOREIGN PATENT DOCUMENTS

| | | |
|---|---|---|
| DE | 1962864 | 3/1971 |
| DE | 2320212 | 11/1974 |

(Continued)

*Primary Examiner*—A. Michael Chambers
(74) *Attorney, Agent, or Firm*—Lowrie, Lando & Anastasi, LLP

(57) ABSTRACT

A system and method for providing process chemicals. The system includes a housing comprising a functional component positioned in a first compartment, a control module positioned in a second compartment and at least one connecting line positioned in a third compartment. At least one compartment is positioned in a defined location in the housing. Modules may be removable received in their respective compartments.

28 Claims, 23 Drawing Sheets

U.S. PATENT DOCUMENTS

| | | |
|---|---|---|
| 6,260,588 B1 | 7/2001 | Noah et al. |
| 6,267,641 B1 | 7/2001 | Vanell et al. |
| 6,276,404 B1 | 8/2001 | Birtcher et al. |
| 6,523,563 B1 * | 2/2003 | Cho et al. .................. 137/338 |
| 6,578,600 B1 * | 6/2003 | Young, Jr. .................. 137/377 |
| 2002/0154567 A1 | 10/2002 | Husher |

FOREIGN PATENT DOCUMENTS

| | | |
|---|---|---|
| EP | 0 443 324 A1 | 8/1991 |
| JP | 02285635 | 11/1990 |
| JP | 07077597 | 3/1995 |
| TW | 424003 | 3/2001 |
| WO | WO 0014512 | 3/2000 |

* cited by examiner

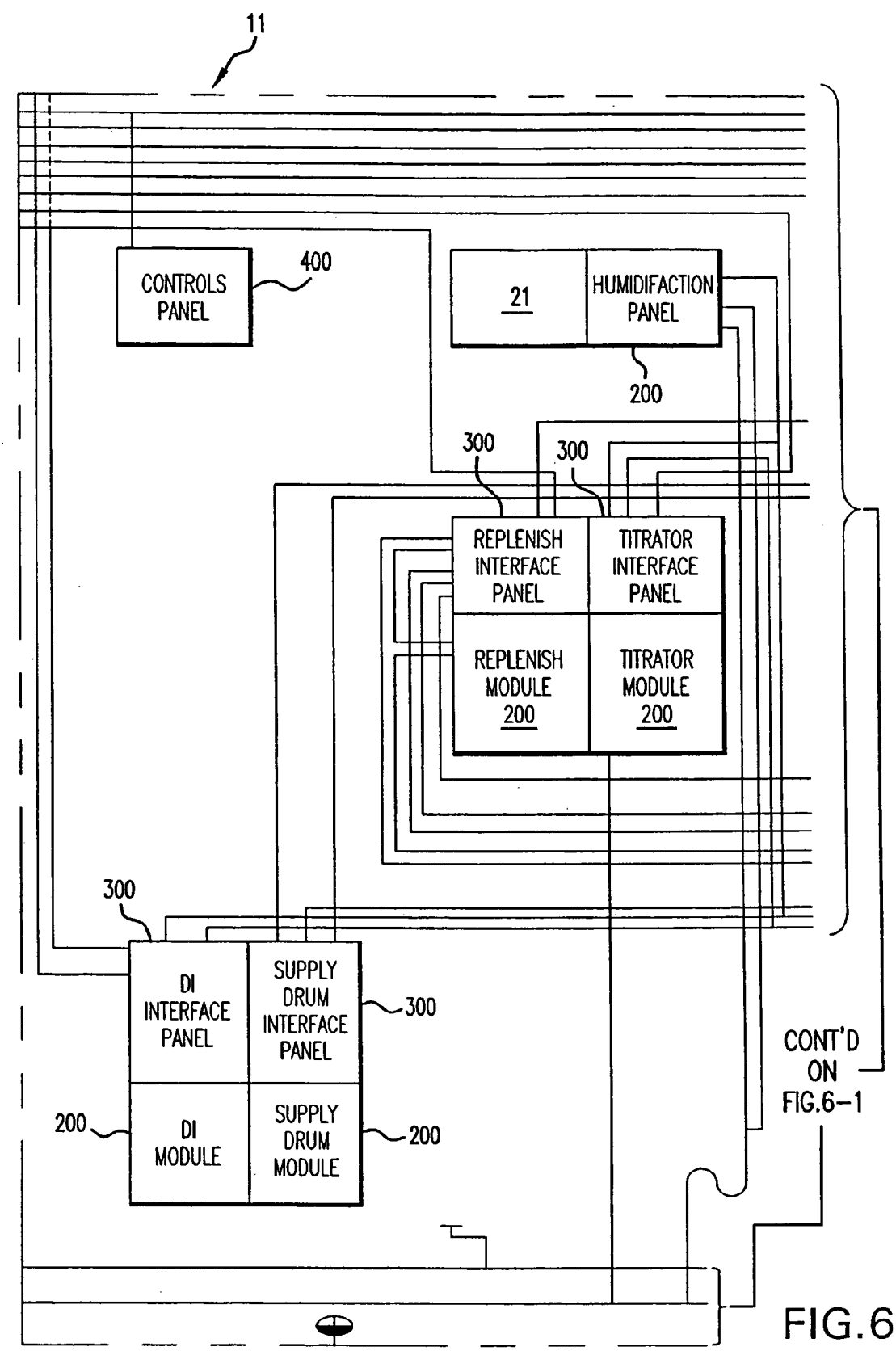

REPLENISH INTERFACE PANEL

TITRATOR INTERFACE PANEL

CONTROLS PANEL

FAB SUPPLY INTERFACE PANEL

HUMIDIFICATION PANEL

ANALYTICS PANEL

DI INTERFACE PANEL

DRUM SUPPLY INTERFACE PANEL

SAMPLE INTERFACE PANEL

INSTALLATION FOR MAKING AVAILABLE HIGHLY PURE FINE CHEMICALS

This application claims priority to German Utility Model Application No. 20205819.0 filed Apr. 12, 2002, now pending which is herein incorporated by reference in its entirety.

FIELD OF INVENTION

The present invention is directed to the field of high purity chemical dispensing, specifically a housing installation.

BACKGROUND

Chemical dispense system (CDS), as well as slurry dispense system (SDS) are commonly used to deliver high purity chemicals in various industries, such as the semiconductor industry. CDS and SDS are particularly useful in the manufacture and production of silicon wafers.

In conventional installations and systems all components, connecting lines and control elements are mounted on walls of a housing. Installations are typically individually designed to meet a specific user's functional and design requirements. This design and construction of user specific installations results in high costs for design and construction as well as a significant expenditure of time. Because each installation may be individually designed, costs and time associated with the maintenance of existing installations may also be high.

SUMMARY OF THE INVENTION

Embodiments of the present invention are directed to dispensing systems in which the time and cost associated with the construction, manufacture, installation, and/or maintenance of the systems is reduced, without restricting the requirements of the individual user.

In one embodiment, the present invention provides a system for providing process chemicals comprising three compartments wherein at least one of the compartments is positioned in a defined location in the housing. A functional module is positioned in a first compartment, a control module is positioned in a second compartment, and at least one connecting line is positioned in a third compartment.

In another embodiment, the present invention provides a system for providing process chemicals comprising a housing having a first compartment constructed and arranged to removably receive any of a maintenance module; a sample; drawing module; an analytical module; a humidifier module; a tank module; a DI module; a mixing module; a mixing tank module; a sensor module; a single pump a maintenance module; a sample; drawing module; an analytical module; a humidifier module; a tank module, a DI module; a mixing module; a mixing tank module; a sensor module; a single pump module; a double pump module; a single filter module; and a double filter module.

In yet another embodiment, the present invention provides a method of providing process chemicals comprising providing a housing comprising a first compartment constructed and arranged to removably receive a functional module, and providing a functional module selected from the group consisting of: a maintenance module; a sample; drawing module; an analytical module; a humidifier module; a tank module; a DI module; a mixing module; a mixing tank module; a sensor module; a single pump module; a double pump module; a single filter module; and a double filter module.

Other advantages, novel features, and objects of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

BRIEF DESCRIPTION OF THE DRAWINGS

Preferred non limiting embodiments of the present invention will be described by way of example with reference to the accompanying drawings, in which:

FIG. 17b is a perspective view of the cabinet element of FIG. 17a; and

DETAILED DESCRIPTION

Figure 1:
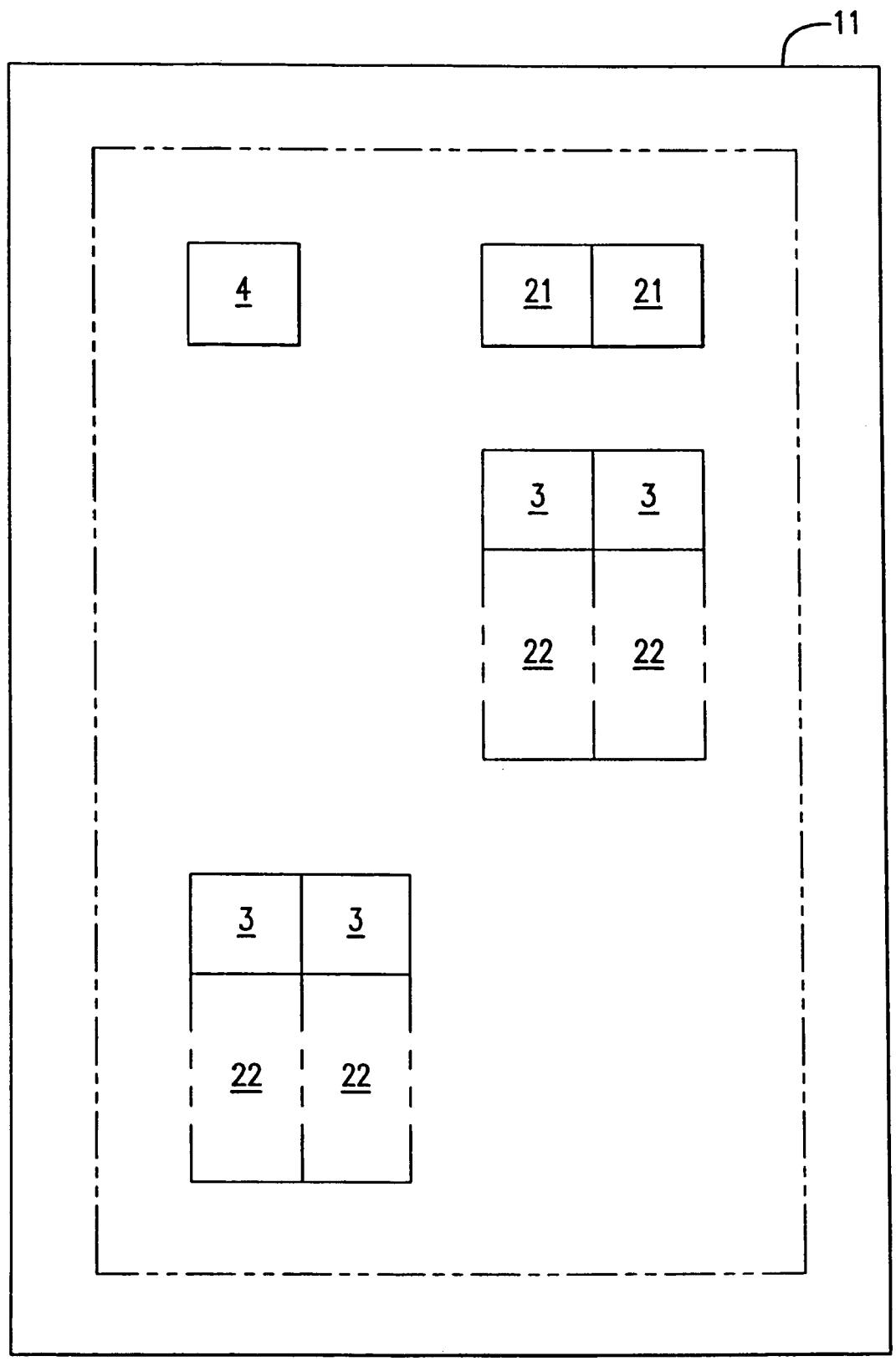
FIG. 1 is a schematic representation of a full cabinet element for inserting different modules and connecting lines.

Embodiments of the present invention concern installations for making available highly pure chemicals, especially for the semiconductor industry. The installations may have various components disposed in a housing and connected in such a way as to carry out one or several specifically desired functions for making available and processing chemicals. The housing may comprise multiple compartments for supporting components, such as, a functional module, a control module, and/or an interface module. The housing may also comprise additional compartments for other components, connecting lines between components, and control elements for controlling the components. The housing may be any size or shape suitable for a particular purpose, and may be formed of any material capable of supporting individual modules: In one embodiment, the housing is a cabinet.

According to one aspect of the invention, a housing is divided into defined compartments, each of which may house a particular module for a specific application. The compartments may be of any size and shape to accommodate a particular module, for example, square, rectangle, circle, and the like and may preferably be constructed and arranged to provide easy access to a particular module. The compartments may also be constructed and arranged so that a module may be easily removed. For example, a compartment may comprise a rack.

One or more functional modules may be selected from available defined functional modules. Certain components such as a control module, in which control elements are placed, may be coupled to the functional module.

In one embodiment, at least a first compartment contains at least a functional module, at least a second compartment contains at least a control module, and at least a third compartment contains a connecting line. In another embodiment several functional modules may be positioned in several first compartments, several control modules may be positioned in several second compartments, and connecting lines may be positioned in several third compartments in a single housing. In a preferred embodiment, each of the several first compartments may be similarly sized to accommodate any of a number of different functional modules. Likewise, each of the second compartments may be similarly sized to accommodate any of a number of different control modules, and each of the third compartments may be similarly sized to accommodate any of a number of different connecting lines.

According to another aspect of the invention, it is possible to select certain defined functional modules before installation allowing future installation on-site which enables the user to combine modules and install them on-site according to the user's individual requirements. Similarly, the housing with defined compartments may also be made at the site, where the user installs on-site the desired functional module, the control module and connecting lines.

Because modules may be selected and installed in defined compartments, a system may be easily made according to individual stipulations of the user. Also, the system may be installed by the user with a noticeable reduction of time and cost. Furthermore, the system may enable greater flexibility in installation, allowing the user the flexibility of modifying system requirements and substituting one module for another. This is especially useful if an original functional module may no longer be used when there is a change in requirements or when the original module becomes inoperative. Moreover, the flexibility in module installation may decrease the time and cost associated with maintenance of the system.

In another embodiment of the invention, the system may include at least one interface module for a corresponding functional module. An interface module may be positioned in a fourth compartment in the housing to facilitate maintenance or simpler replacement.

In one embodiment, at least one of the compartments is constructed and arranged so that the module positioned in a corresponding compartment may be removed. In a preferred embodiment, the compartment is designed as a rack.

In another preferred embodiment, the at least one functional module positioned in a first compartment and/or the control module positioned in a second compartment of the at least one housing may be removed, whereby the first and/or second compartment is designed as rack. In this way, maintenance and replacement of the functional module and/or the control module can be performed easily.

In another preferred embodiment of the invention including connecting hydraulic lines, the housing may comprise a fifth compartment so that hydraulic supply lines and hydraulic drain lines may be separated from each other. In one embodiment, the hydraulic supply lines may be positioned in the third compartment and the hydraulic drain lines may be positioned in the fifth compartment in the housing. As a result, the supply lines and compartments can be arranged separately from one another and insertion of the connecting lines can be further simplified.

To the extent that connecting lines include hydraulic auxiliary lines, a sixth compartment may be included in the at least one housing to contain the auxiliary lines. This enables the auxiliary lines to be arranged separately from the main lines. This also applies to electrical connecting lines, which may be placed into a seventh compartment.

The housing may also comprise aeration and ventilation channels positioned in one more eighth compartments. In a preferred embodiment, the aeration and ventilation channels are separated from the other components.

It is understood that any combination of the first compartment to the eight compartment may be present in a housing. In addition, any number of each of the individual compartments may be present in the housing. Several of each of the first to eighth compartments are possible and, thus, numerous compartments of the same kind can be foreseen.

In another embodiment of the invention, each compartment may be placed at a defined location in the at least one housing. Defining the location of a particular compartment in the at least one housing simplifies pre-fabrication as well as fabrication of the housing. Moreover, on-site installation is simplified, because the components assigned to the individual compartments may be installed at the same location. The compartments for the electrical connecting lines, the control module and/or aeration and ventilation channels may be placed in the upper part of the housing, so there is a clear separation from the other components.

In another embodiment, several housings may be placed near or adjacent one another and/or connected. Multiple housing may be useful for complex apparatuses or when systems are made from several apparatuses. Generally, the housings may be arranged as cabinet elements. Preferably, in each housing, compartments of the same type are placed in the same defined location in each housing, to simplify installation. The compartment for the aeration and ventilation channels may be constructed arranged so that, if housings are interconnected, the aeration and ventilation channels of one housing may be connected to the channels of an adjacent housing at inlet and outlet areas.

In yet another embodiment, electronic control equipment may be placed into a housing which may be separate from at least a main housing. In a preferred embodiment, the electronic control equipment is positioned in a separate housing to protect the control equipment from any potential chemical influence.

Functional modules may be any module which performs a desired function. Functional modules may be of any size and shape that may be installed into a defined compartment. Preferably the selection of available, defined functional modules includes, but is not limited to, a maintenance and sample pulling module, which may contain rinse switching; an analytical module, for example, for measuring conductivity, titration and particles; a humidifier module, for example for saturating process nitrogen; a tank module, for example for use as a day tank and/or supplier tank module; a DI module for rinsing of e.g. discharged chemicals; a mixing module, which may contain valves or valve groups; a mixing tank module, which preferably has sensors for determining the mixing ratio; a sensor module, for example for detecting flow, pH value and/or the density of process chemicals; a single-pump module; a double pump module; single filter module; and a double filter module.

In FIG. 1, a full cabinet element 11 is shown schematically. Cabinet element 11 has an upper section including two generally square compartments 21 adjacent one another to house functional modules, and a generally square compartment 4 to house a control module; a middle section including an arrangement of two generally square compartments 3 adjacent one another to house interface modules, and generally rectangular compartments 22 disposed adjacent one another and below compartments 3 to house additional functional modules; and a lower section including an arrangement of compartments 3 and 22 similar to the arrangement in the middle section.

Figure 2:
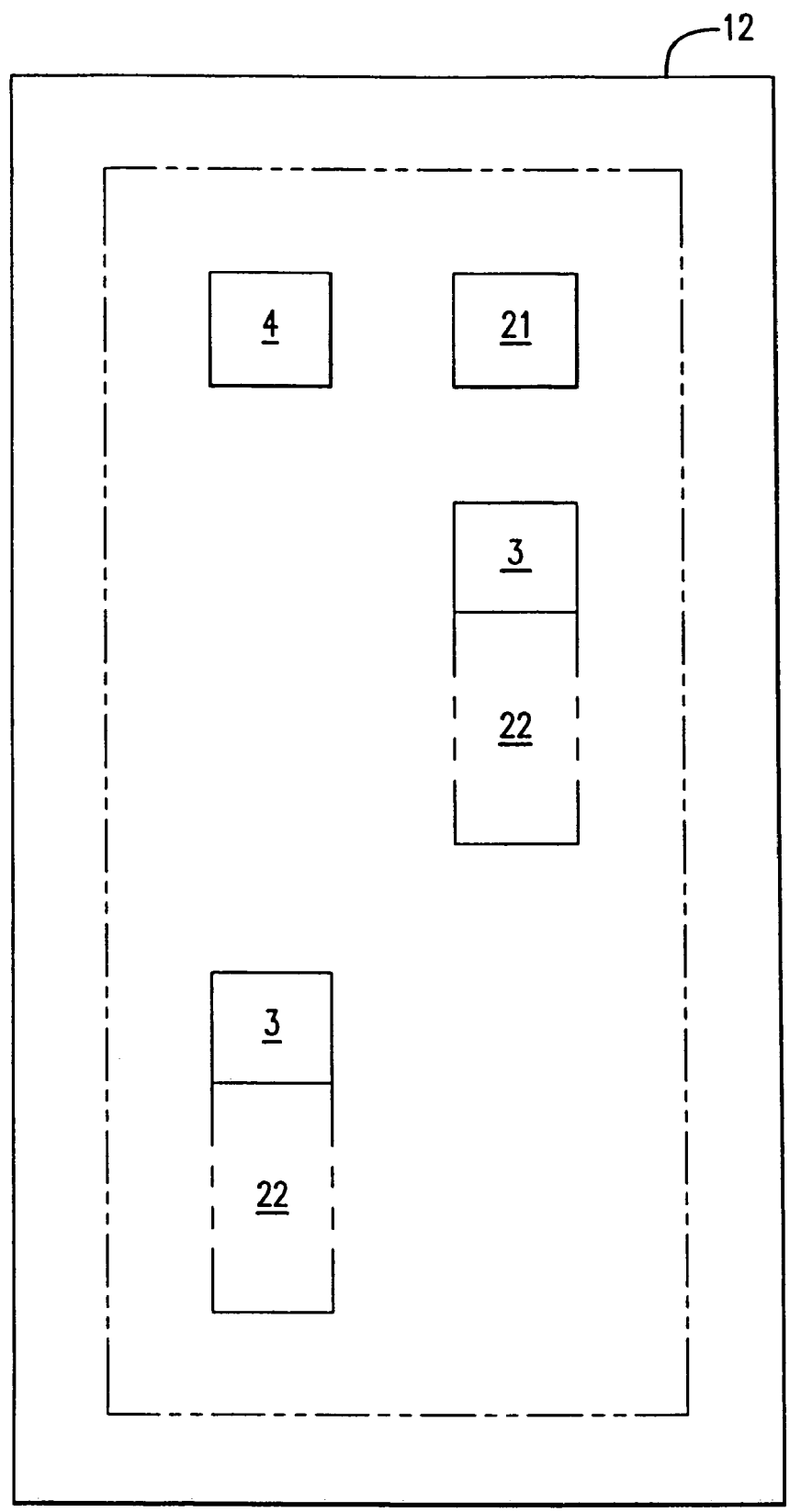
FIG. 2 is a schematic representation of a half cabinet element.

In FIG. 2, there is a schematic representation of a half cabinet element 12. In the upper section, there is a generally square compartment 21 to house a functional module and a generally square compartment 4 to house a control module. In the middle section there is a generally square compartment 3 to house an interface module and another generally rectangular compartment 22 disposed below compartment 3 to house another functional module. The lower section-has a similar arrangement as the middle section. The half cabinet element 12 is preferably the same height as the full cabinet element 11 in FIG. 11, but is preferably not as wide.

Figure 3:
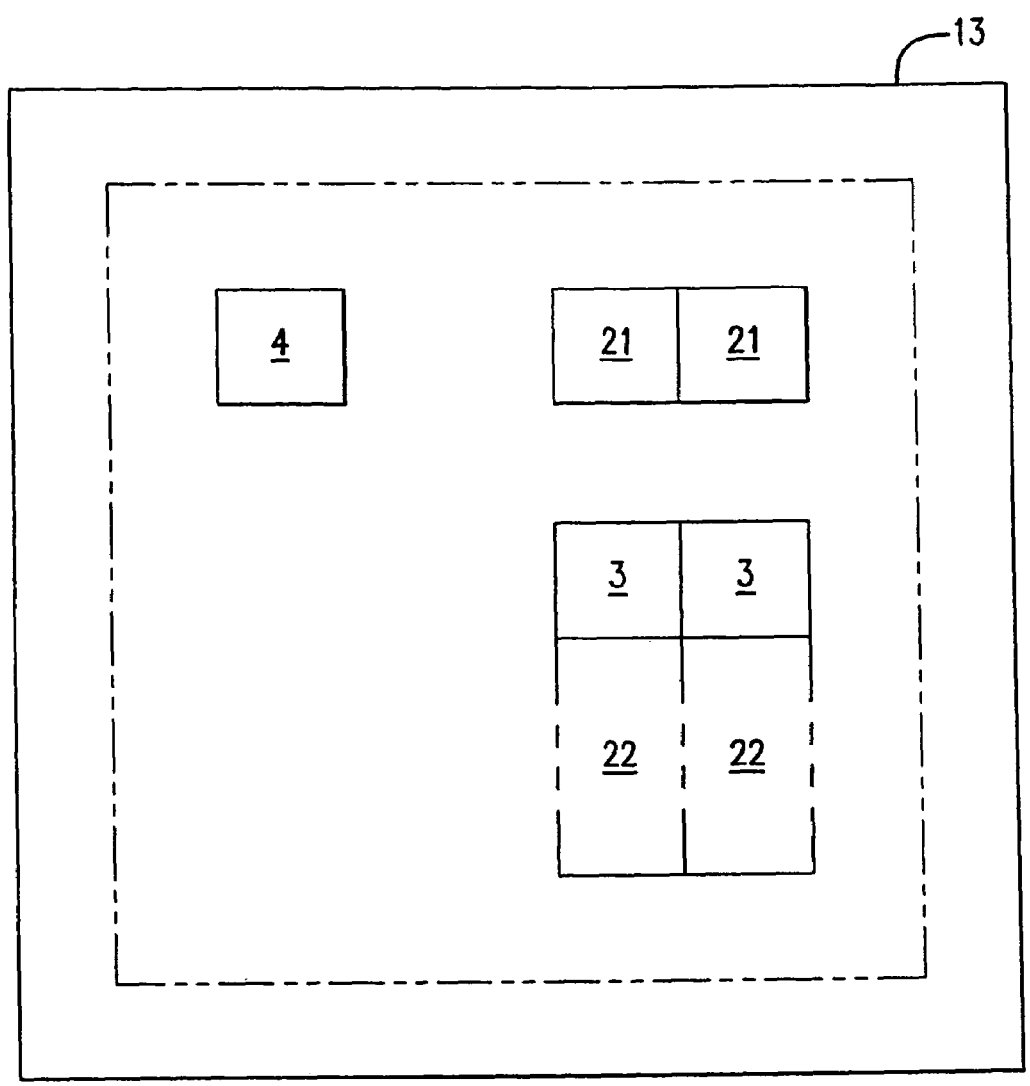
FIG. 3 is a schematic representation of a half-high cabinet element.

A half-high cabinet element 13 is schematically represented in FIG. 3. In the upper section there are two generally square compartments 21, adjacent one another to house functional modules. Next to these is a generally square compartment 4 to house a control module. In the lower section, there is an arrangement of two generally square compartments 3, adjacent one another to house interface modules and, below, two generally rectangular compartments 22 to house additional functional modules. The half-high cabinet element 13 is preferably the same width as the full cabinet element 11 in FIG. 1, but is not preferably as high.

Figure 4:
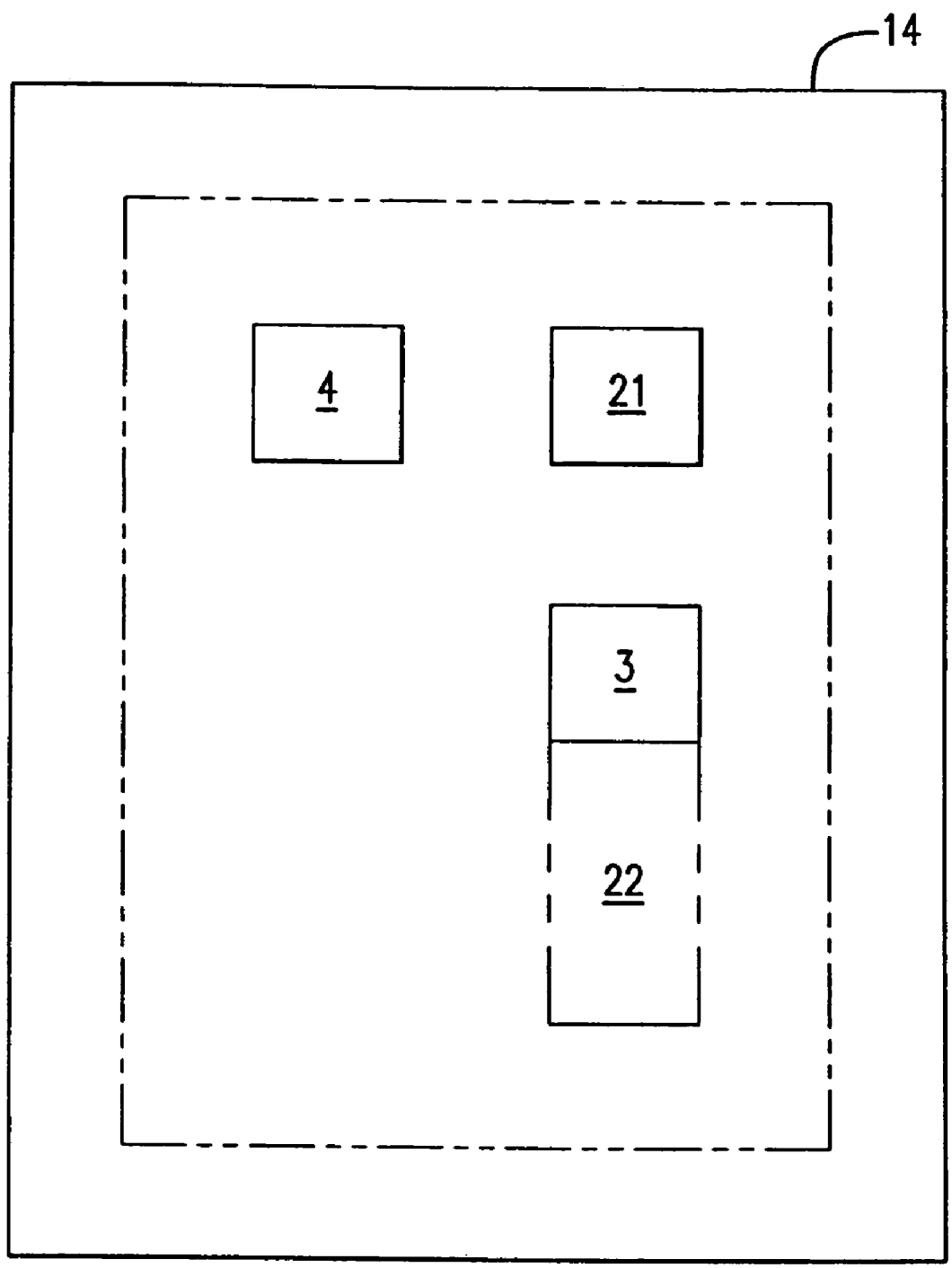
FIG. 4 is a schematic representation of a half-high half cabinet element.

Another embodiment of a half-high half cabinet element is schematically represented in FIG. 4. In the upper section there is a generally square compartment 21 for a functional module and at a distance from this is a generally square compartment 4 for a control module. In the lower section, there is an arrangement consisting of a generally square compartment 3 to house an interface module and a generally rectangular compartment 22 disposed below to house another functional module. The cabinet element 14 preferably has the same width as the half cabinet element 12 in FIG. 2 and preferably has the same height as the half-high cabinet element 13 in FIG. 3.

The cabinet elements 11 to 14 shown in FIGS. 1 to 4 illustrate that the compartments may be arranged like drawers in a bedroom cupboard. Depending on their function, the compartments may be assigned to defined locations within a housing. In a preferred embodiment, compartments of the same type are similarly positioned with an individual housing such as a cabinet element. Moreover, the compartments may be designed as racks which may be slid into and out of the housing, not shown, so that the modules may be easily changed. In such a rack-type mounting, a fastening element, such as a bolt or a latch, may be used to removably lock modules disposed within the various compartments in place.

Figure 5:
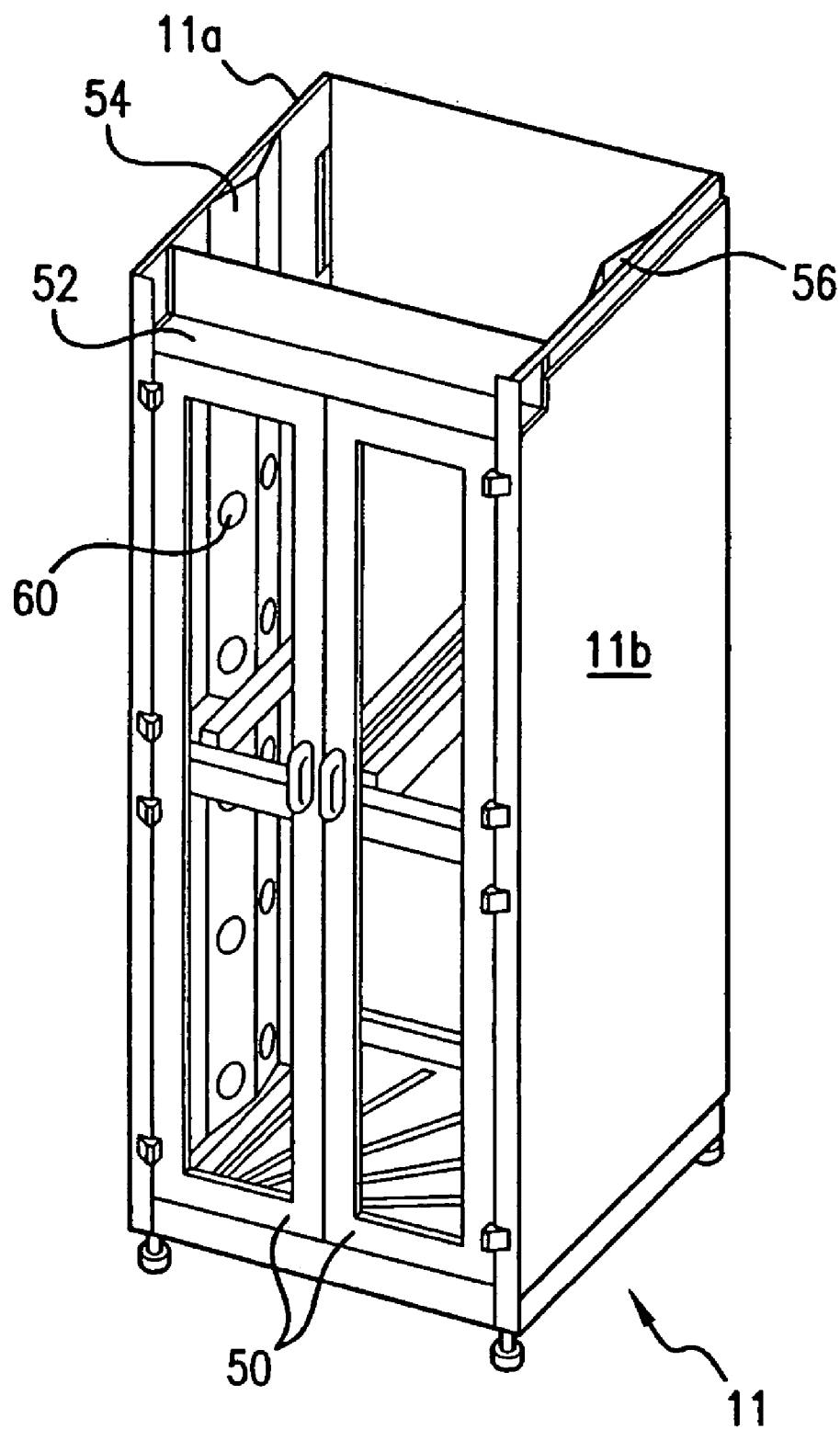
FIG. 5 is a perspective view of the cabinet element of FIG. 1.

In FIG. 5, cabinet element 11 is also represented in perspective view. The cabinet element 11 shown may be closed with a double-wing door 50, as is illustrated in FIG. 5, to protect the components in the cabinet element from dust and moisture. In the case of smaller cabinet elements 12 and 14 shown in FIGS. 2 and 4, a single-wing door is preferable.

A housing or cabinet element may also have channels (not shown) for the hydraulic lines at different defined locations. If the hydraulic supply lines include main and auxiliary lines as well as supply and drain lines, separate channels may be used. In the case of the channels mentioned, but not shown in the figures, the channels are assigned to defined locations in the cabinet element as described for the compartments above.

Cable channels for electrical supply lines may also be included in the housing or cabinet elements. Cable channels may comprise one or more separate compartments in order to separate the electrical supply from other components. The cable compartments may have any size and shape that allows appropriate positioning of the cables. In one embodiment, the cable channels or compartments are placed in the upper section of the cabinet element, preferably above the hydraulic components, thereby separating the electrical supply from other components. The cable channel may partially or completely extend across the cabinet element. In one preferred embodiment, the cable channel extends entirely across the cabinet element. As illustrated in the embodiment of FIG. 5, cable channel 52 has a rectangular cross section, is arranged on the upper side of cabinet element 11 at the front, and extends over the entire width of the cabinet element. Since cable channel 52 extends over the entire width of the cabinet element and is open on both ends, there is a simple connection of the cable channels and thus, a continuous cable channel is formed, when several cabinet elements are combined.

Aeration and ventilation channels may be positioned at defined locations in the housing. By defining locations for aeration and ventilation equipment, the housing or cabinet element may be standardized.

As shown in FIG. 5, two channels 54, 56 are positioned along opposing interior walls of cabinet element 11. One channel is designed as a ventilation channel and the other channel as an aeration channel. According to the embodiment illustrated in FIG. 5, channel 54 is positioned on an interior surface of a side wall 11a and the other channel 54 is on an interior surface of an opposing side wall 11b. Both channels 54, 56 have openings 60, directed toward the interior of the housing, as can be seen for channel 54 in FIG. 5. Moreover, both ventilation and aeration channels 54, 56, extend to an upper edge of the cabinet element. Because the channels extend to the upper edge of the cabinet element, the channel of one cabinet element can be simply connected with a neighbouring channel in an adjacent cabinet element with a short connector, not shown, when two or more cabinet elements are arranged adjacent one another.

Figures 1, 6:
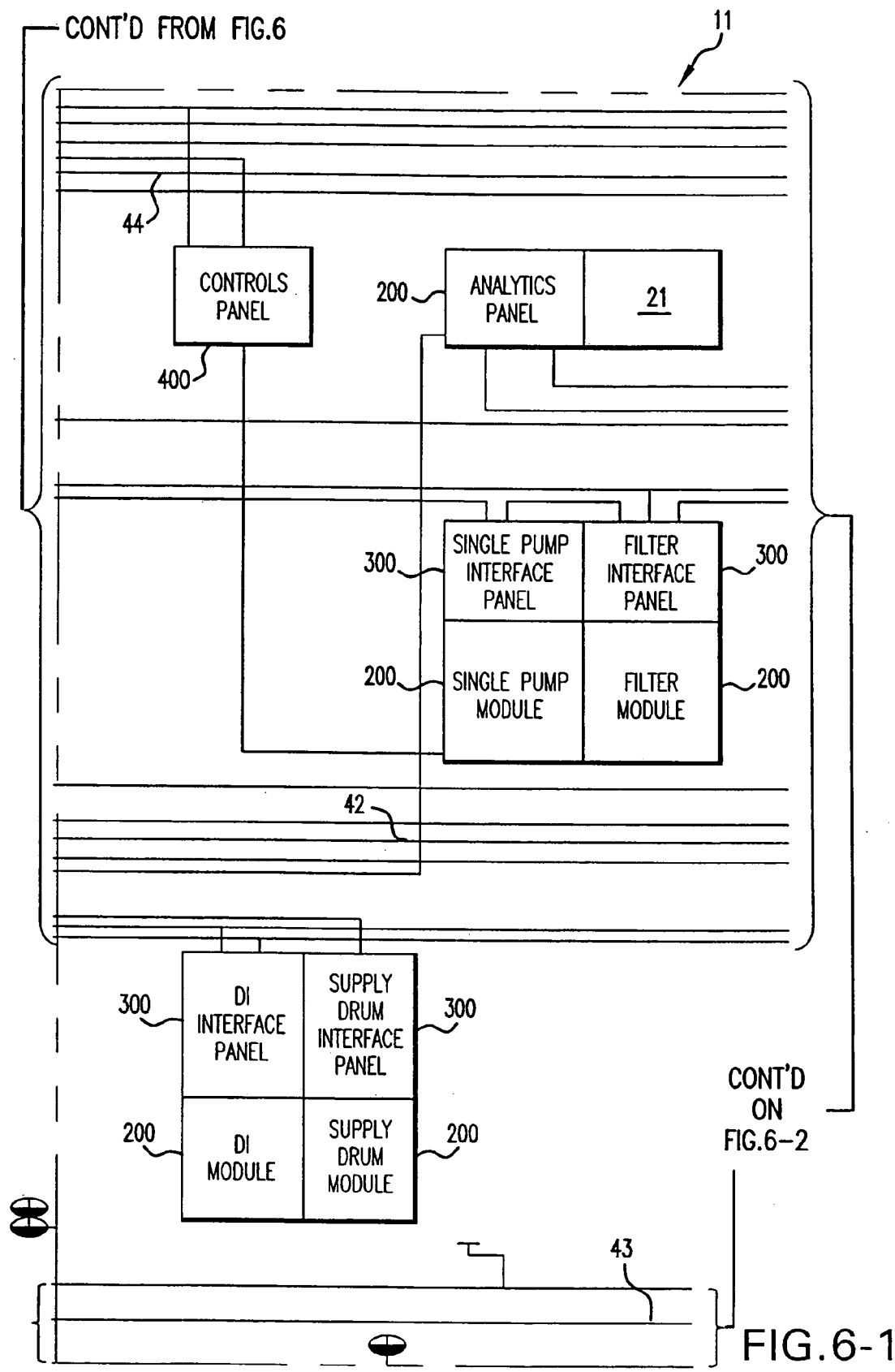
FIG. 6 is a schematic view of an apparatus comprising four full cabinet elements.
Figures 2, 6:
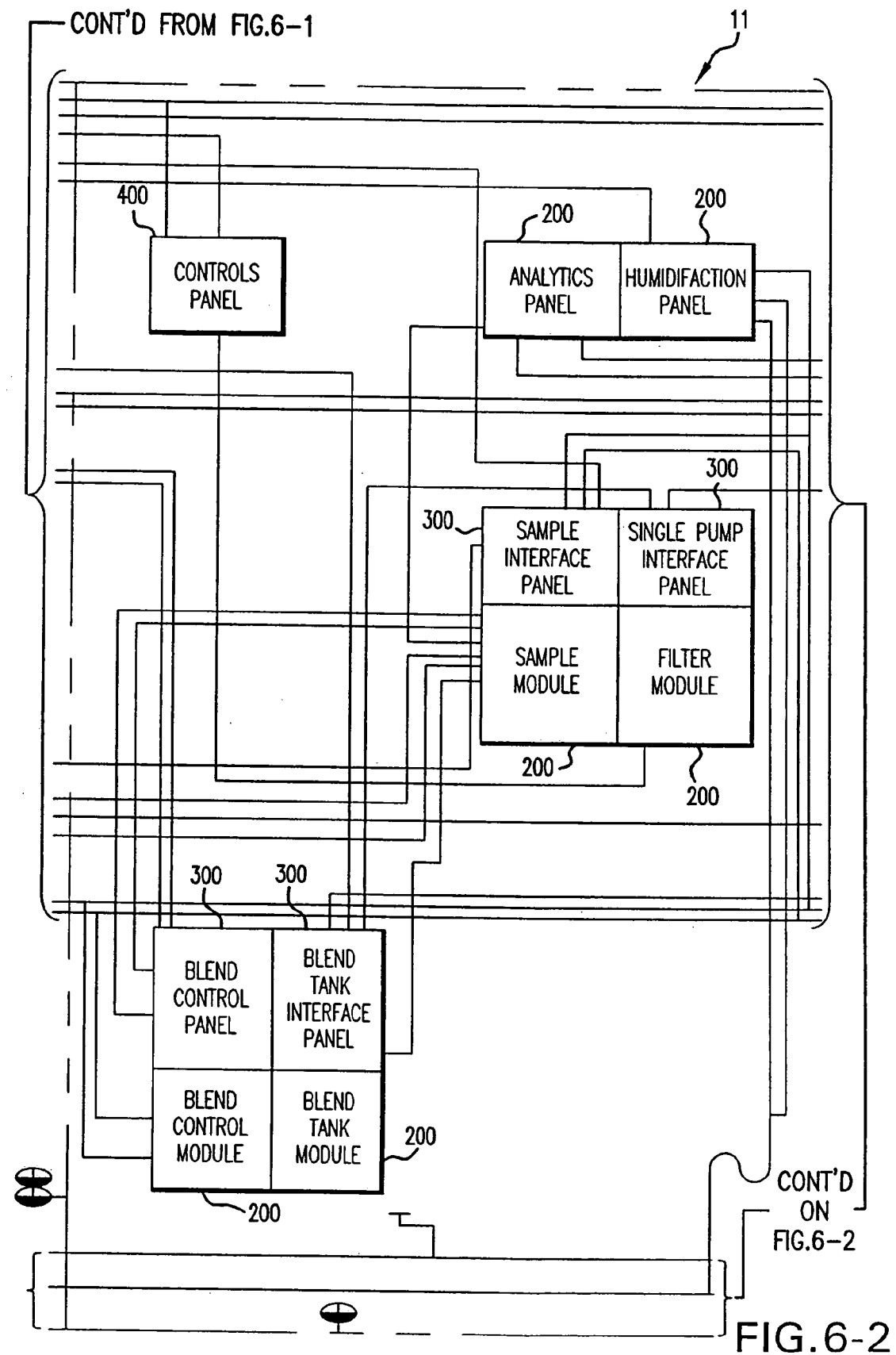
Figures 3, 6:
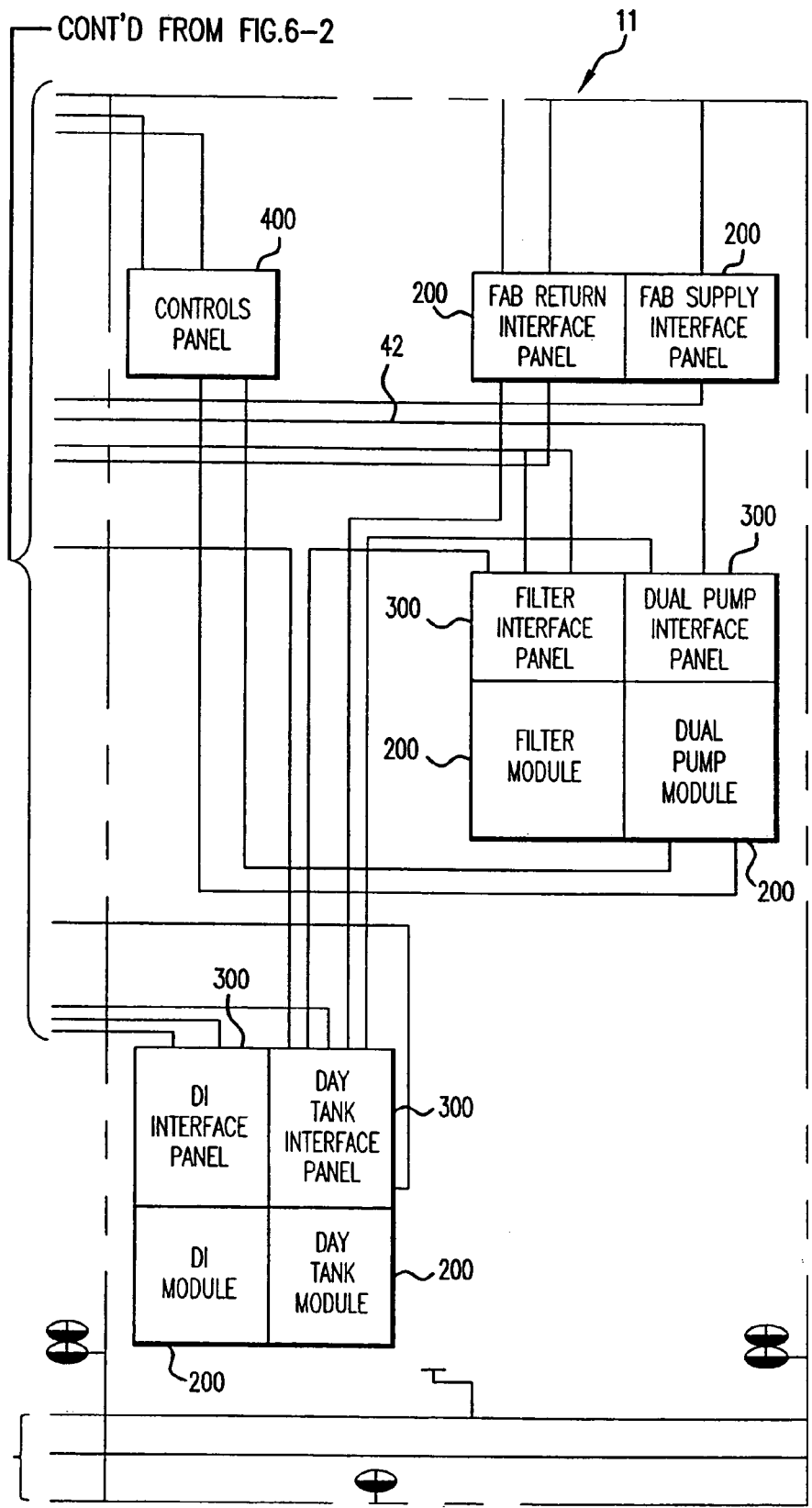
Figure 7:
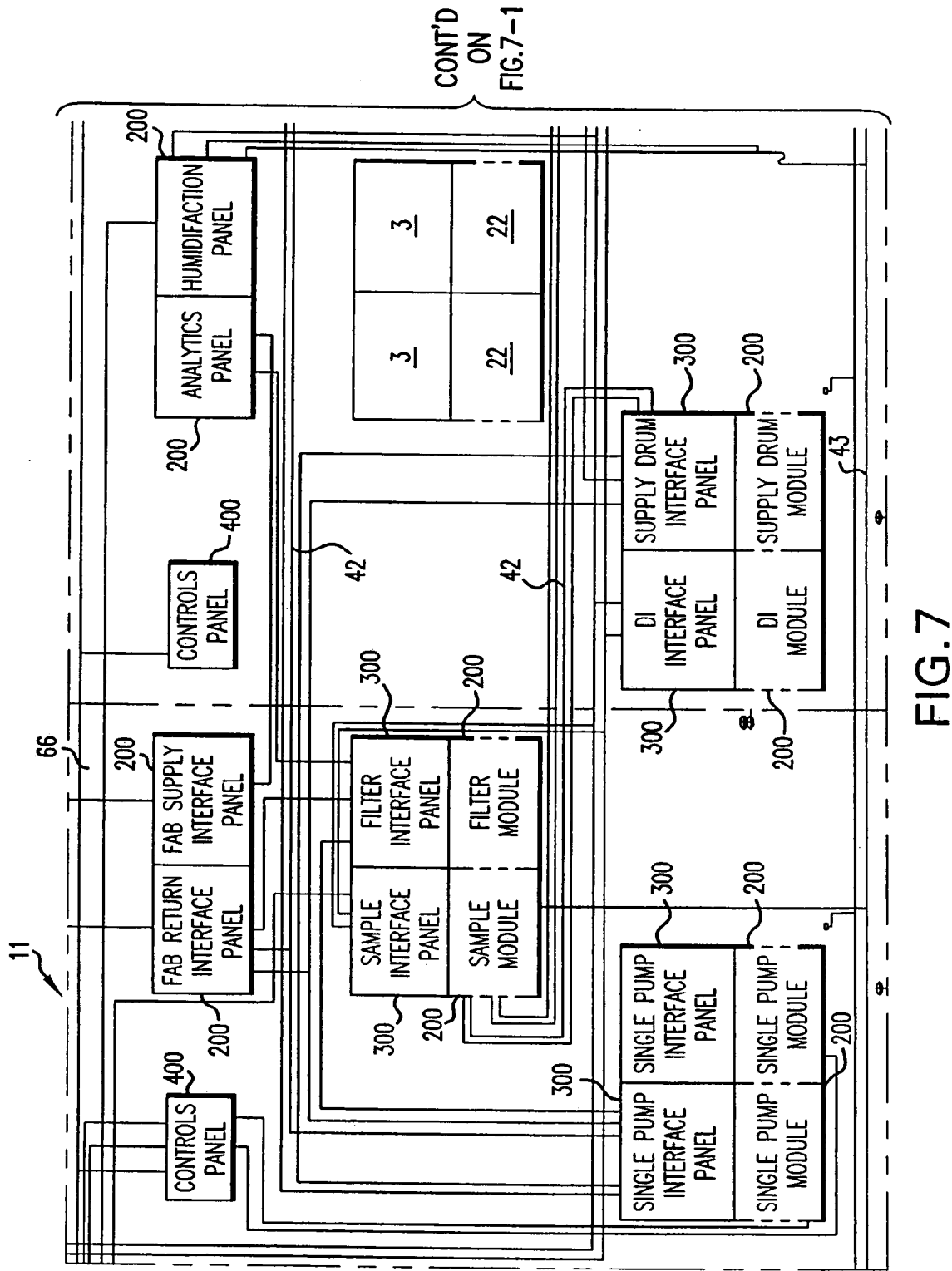
FIG. 7 is a schematic view of an apparatus comprising three full cabinet elements.
Figures 1, 7:
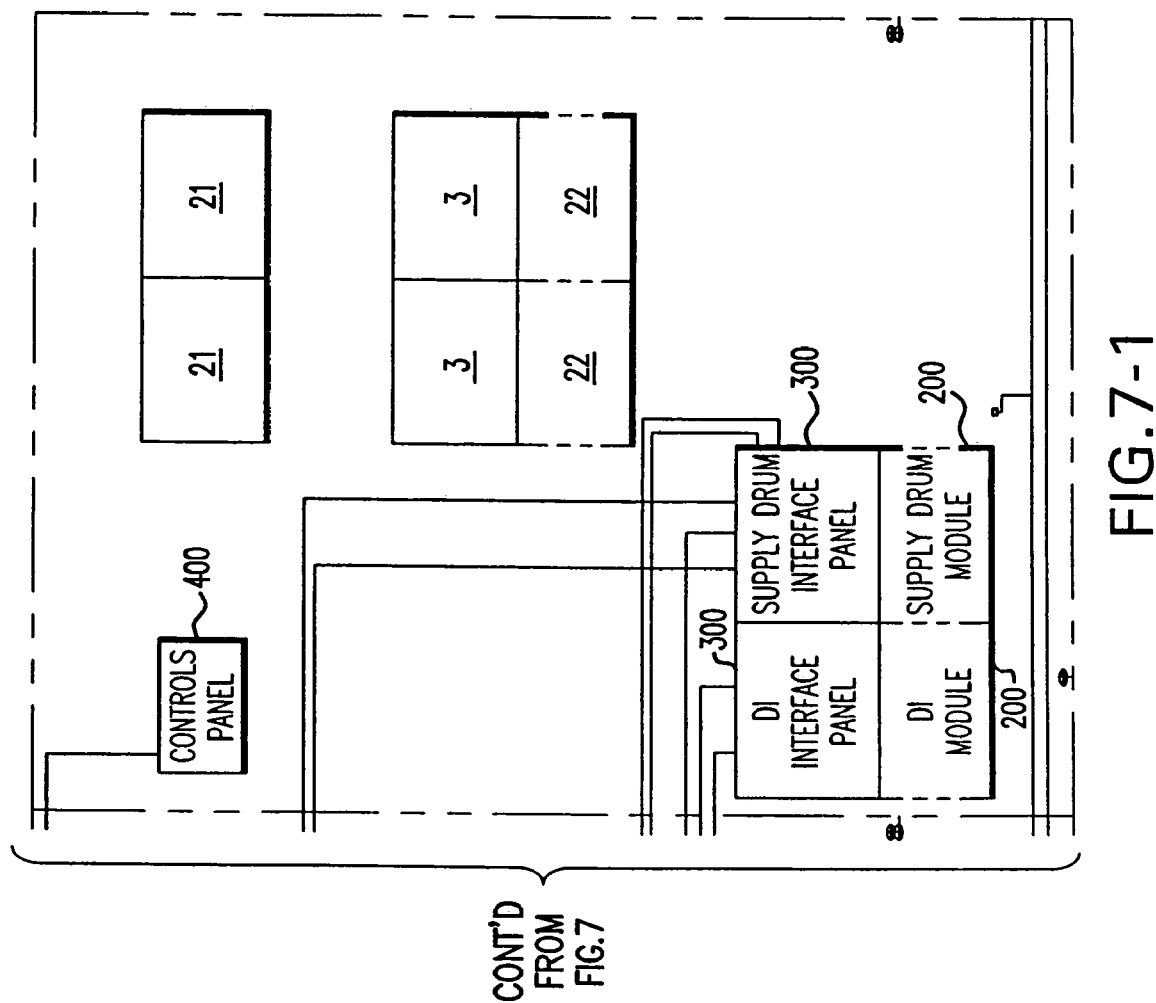
Figure 8:
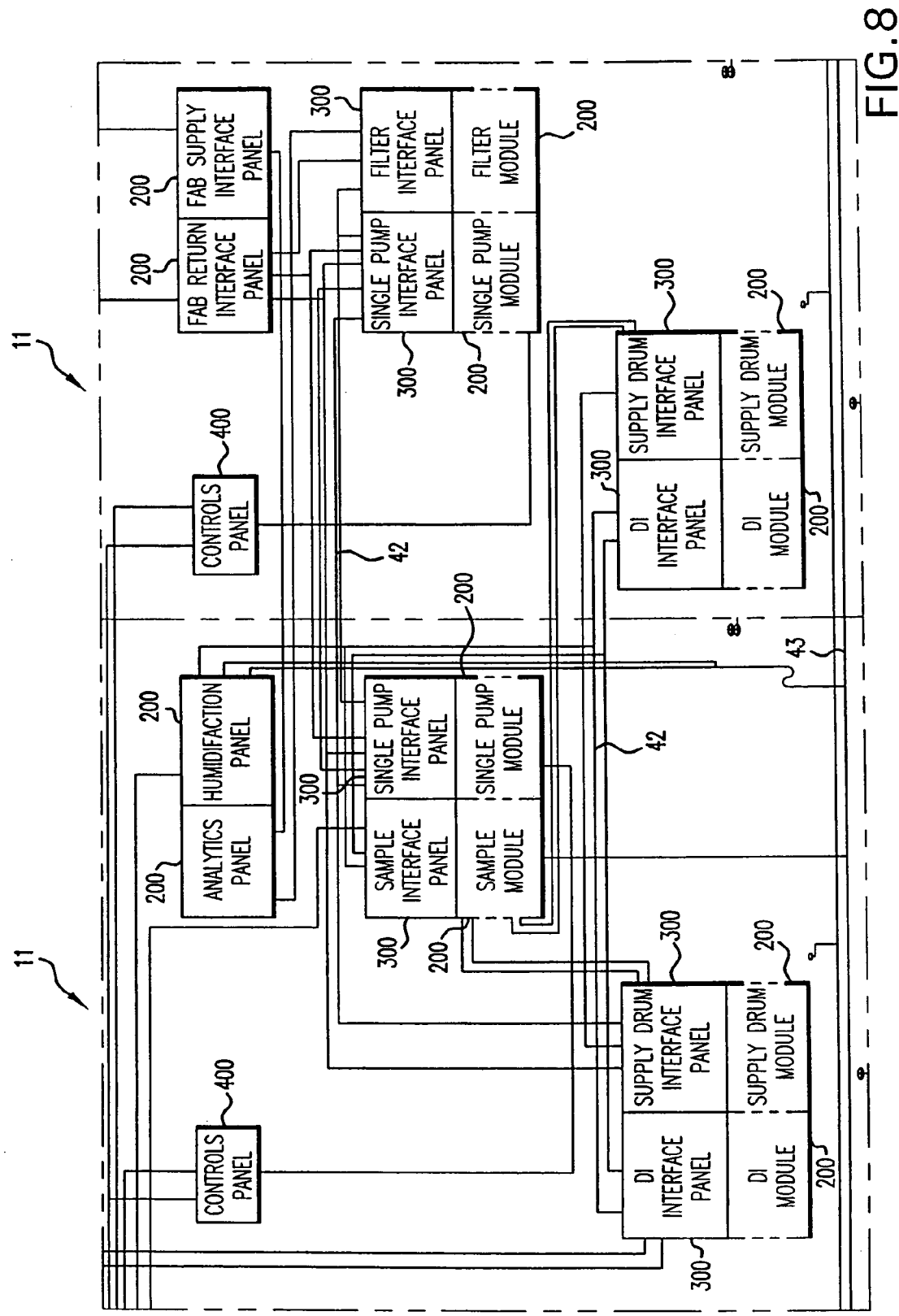
FIG. 8 is a schematic view of an apparatus comprising two full cabinet elements.

As can be seen from FIGS. 6 to 8, several cabinet elements may be placed next to one another for assembling complex supply systems. Here, it is advantageous when the channels for hydraulic supply lines and the electrical lines, as well as the cabinet elements, aeration and ventilation channels are positioned at defined locations and extend to each side of the cabinet elements, so that each may be simply oriented and connected to corresponding channels of a neighbouring cabinet element.

FIG. 6 shows a connecting schematic diagram of a fully designed mixing and supply system with typical functions. In this embodiment, there is an arrangement of four full cabinet elements 11, next to one another, and of the type shown in FIGS. 1 and 5. As FIG. 6 shows, most compartments 21 and 22 (see FIG. 1) are occupied with corresponding functional modules 200, while in the two left cabinet elements according to FIG. 6, only one compartment 21 is left empty in the upper section, because there no further functional module is needed. In all cabinet elements 11, all compartments 3 (see FIG. 11) are occupied with interface modules 300 for connecting correspondingly assigned functional modules 200. Additionally, compartment 4 (see FIG. 1) has a control module 400 in each cabinet element.

As FIG. 6 shows, supply lines 42 and 44 run in different horizontal levels, where corresponding channels may be included, as has been mentioned, but not shown in the figures. The supply lines in the upper section of the cabinet element 11 are hydraulic lines 44, including supply and drain lines. Auxiliary lines 42 are in the middle section of the cabinet element 11, while in the lower section, drain lines 43 are included, which may be channels. In the upper section, below a cover, a cable channel may also be used for electrical lines. While not illustrated in FIG. 6, such a channel 52 is shown in FIG. 5. As has already been mentioned, the channels (not shown) for the supply lines may end at corresponding defined places on the side walls of the cabinet element, so that the channels can be connected with corresponding channels in the neighbouring cabinet element.

In FIG. 7, there is a connection diagram of another embodiment of a fully designed supply system with two transport vessel places, in which three full cabinet elements 11 of the type shown in FIGS. 1 and 5 are used. In this embodiment, not all compartments 21, 22 for the functional modules and compartment 3 for interface modules are occupied, because fewer functional and interface modules 200, 300 are needed than in the system illustrated in FIG. 6.

FIG. 8 shows a diagram of a space-optimised, but fully formed supply system with two transport vessel places, consisting of two full cabinet elements of the type shown in FIGS. 1 and 5.

Figure 9:
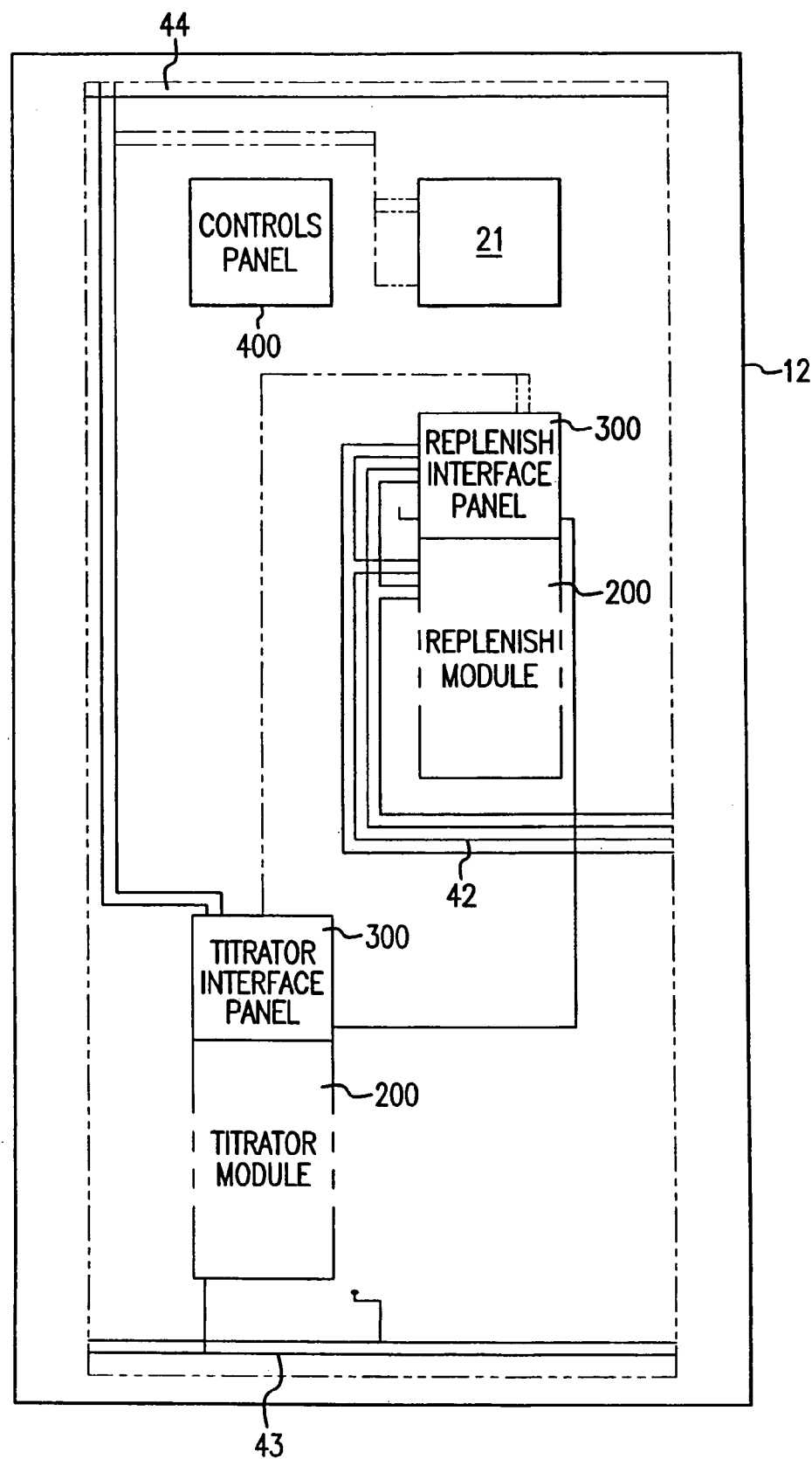
FIG. 9 is a schematic view of an apparatus comprising a half cabinet element.

FIG. 9 shows a diagram of a re-filling element which requires only a half cabinet element 12 of the type shown in FIG. 2. The upper compartment 21 in this embodiment is not occupied.

Figure 10:
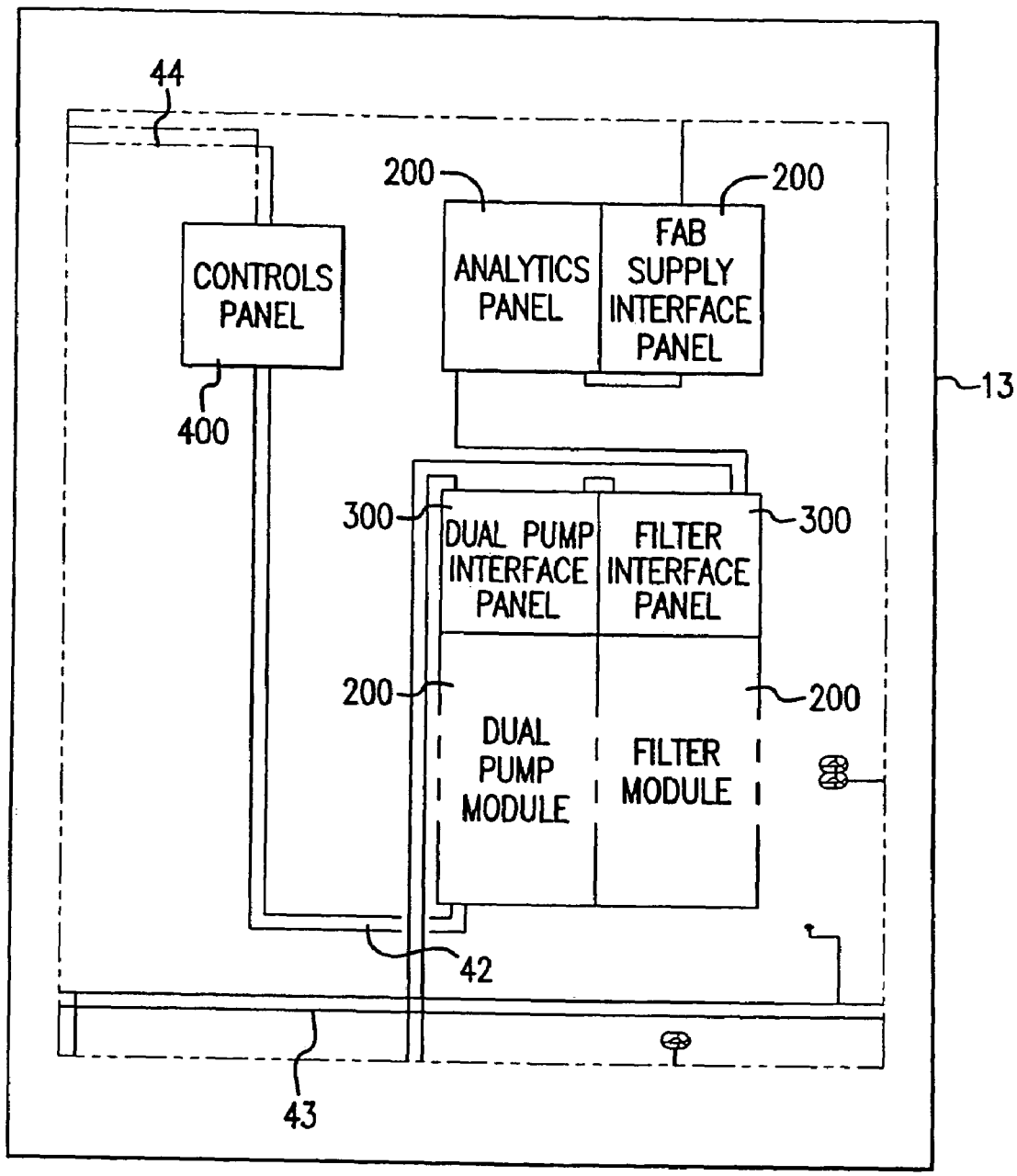
FIG. 10 is a schematic view of an apparatus comprising a half-high cabinet element.

FIG. 10 shows a diagram of a supply element that can also stand alone and has a half-high cabinet element 13 of the type shown in FIG. 3. In this embodiment, all compartments 21, 22, 3, and 4 are occupied with the corresponding functional modules 200, interface modules 300 and control module 400.

Figure 11:
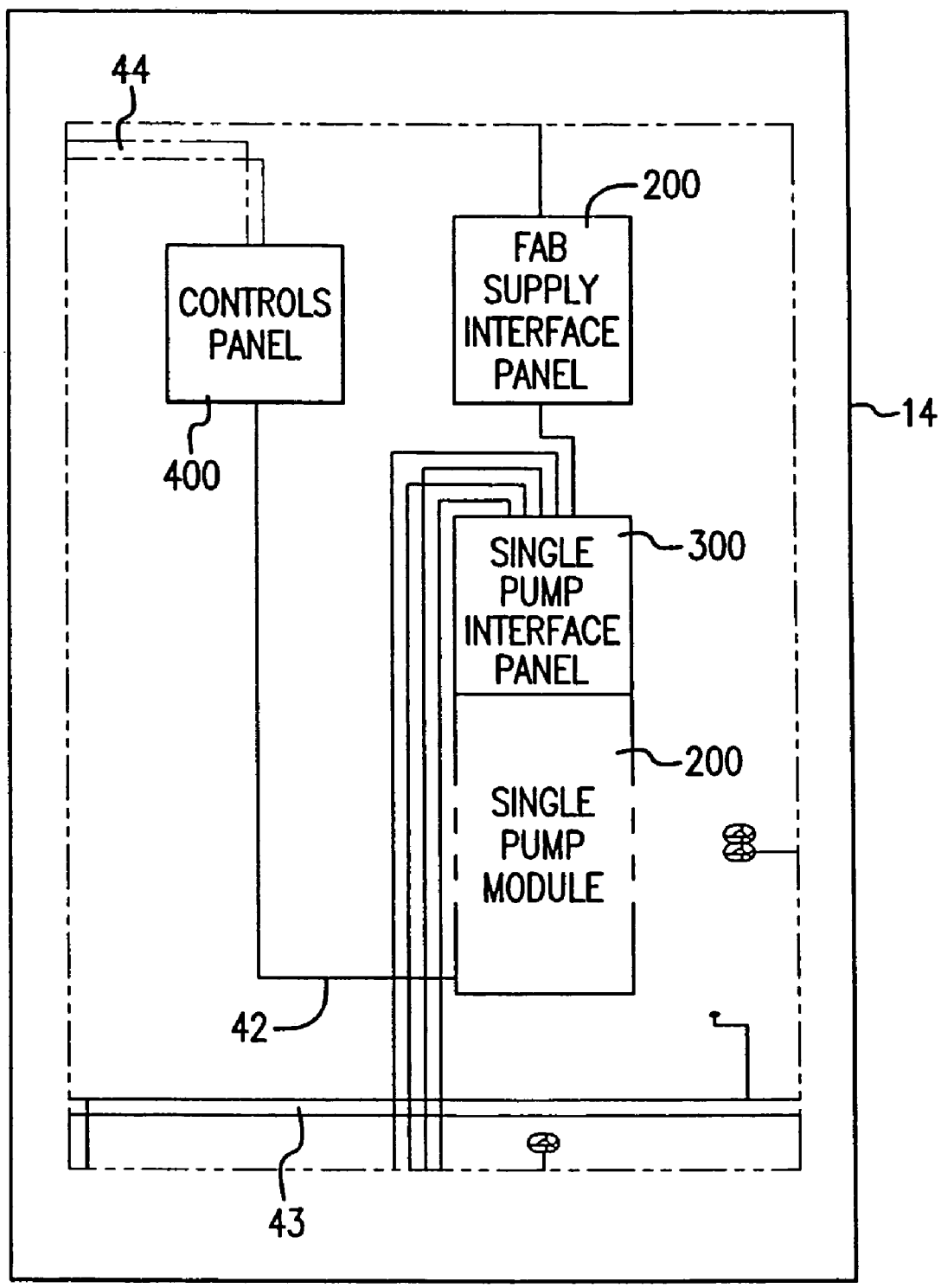
FIG. 11 is a schematic view of another apparatus comprising a half-high cabinet element.

FIG. 11 shows the diagram of a relatively simple supply element, which can stand alone and has a half-high half cabinet element 14 of the type shown in FIG. 4. In this embodiment, all compartments are occupied with corresponding modules.

Figure 12:
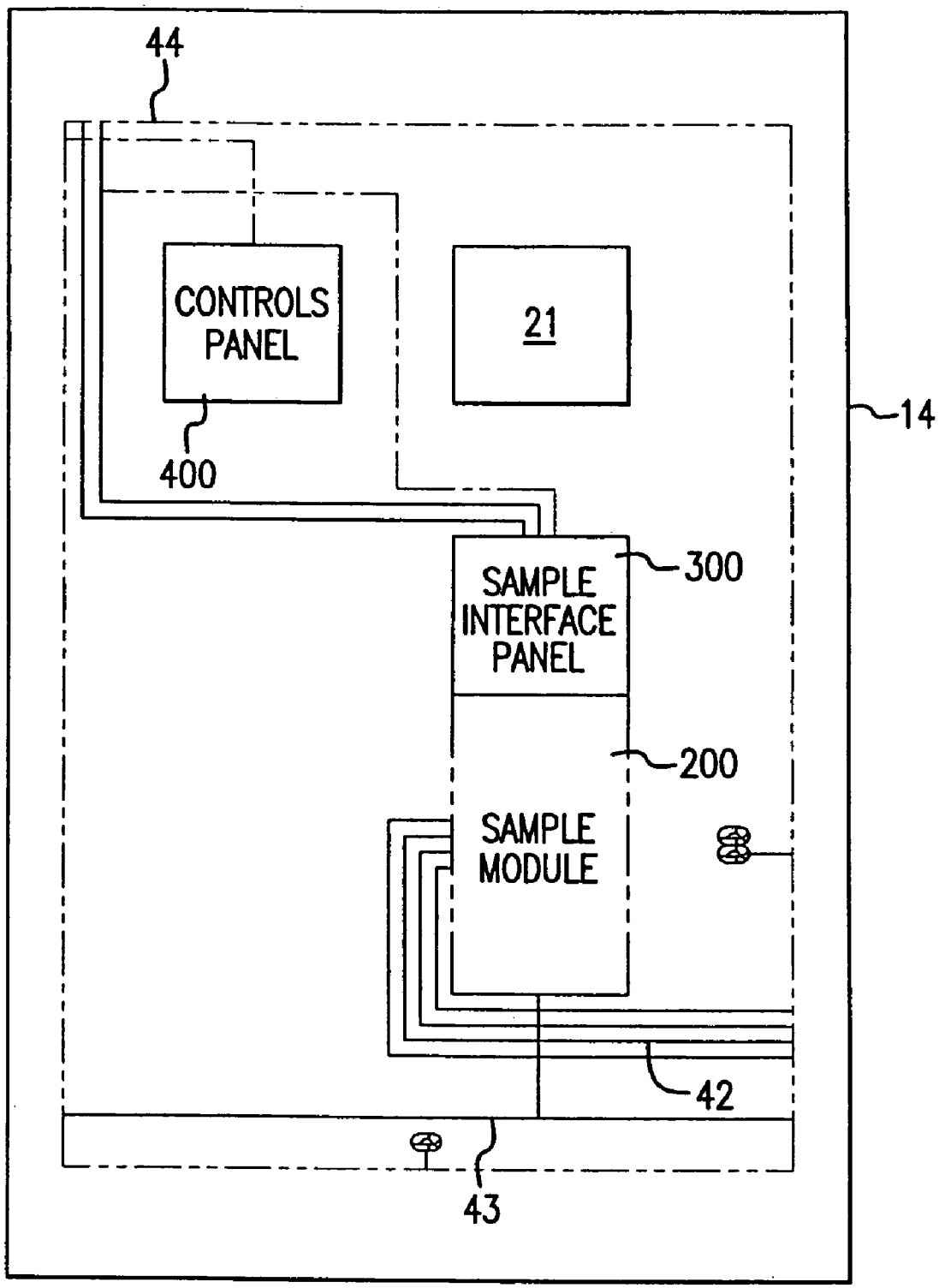
FIG. 12 is a schematic view of an apparatus comprising a half-high half cabinet.

FIG. 12 shows the diagram of a sample pulling element, which can also stand alone and include half-high half cabinet element 14 of the type shown in FIG. 4. In this embodiment, the upper compartment 21 is not occupied.

As a comparison with the embodiments of FIGS. 7 to 12 with the embodiment of FIG. 6 shows, the same or similar arrangements and procedures may be selected for the supply elements 42 to 44.

Figure 13:
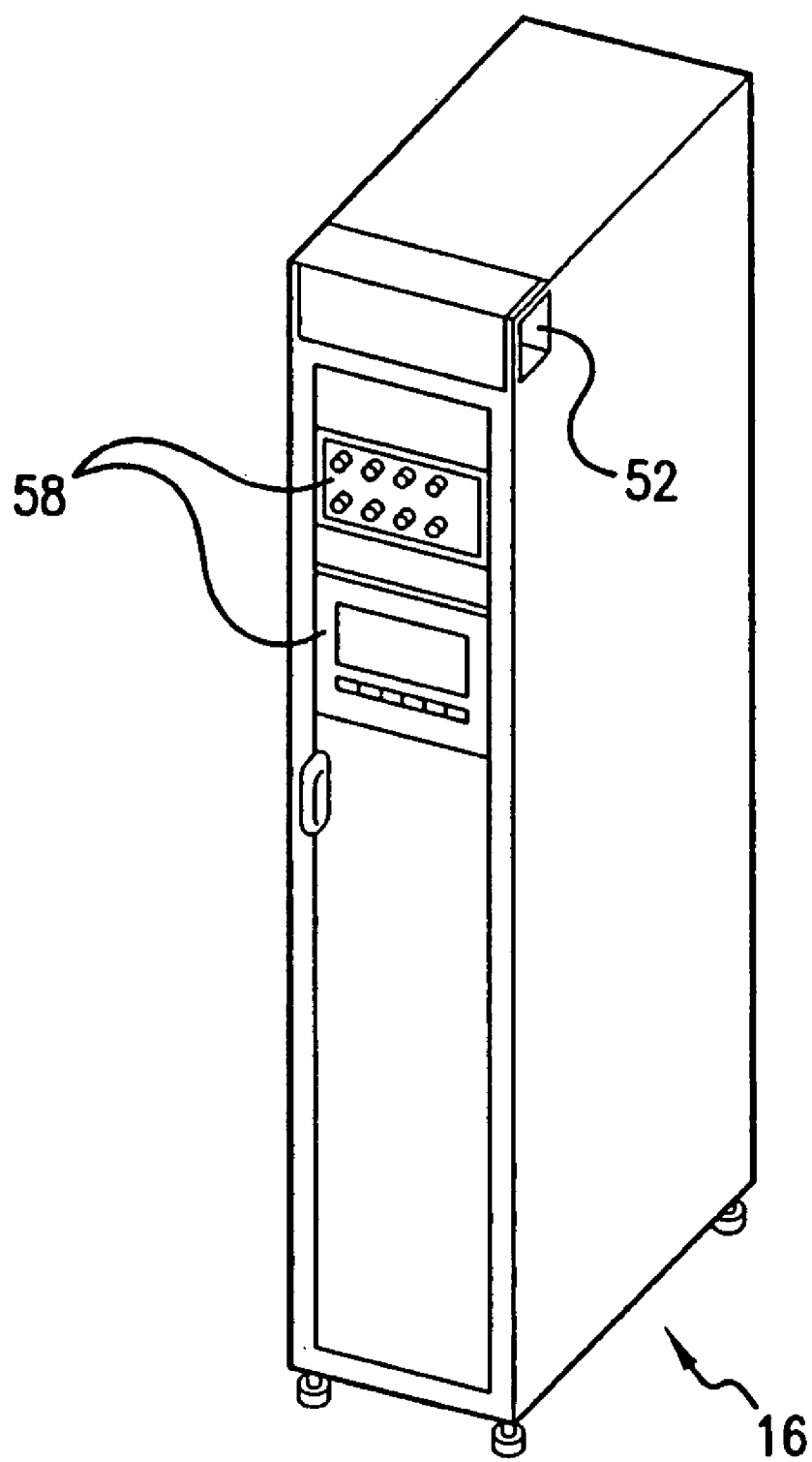
FIG. 13 is an embodiment of an additional cabinet element containing electronic equipment.

If electronic control equipment is needed, it may be placed in an additional cabinet element, which is separated from the other cabinet elements, so that the control equipment is not influenced by chemicals and may provide sufficient protection to meet industry standards. FIG. 13 shows an additional cabinet element 16 containing electronic control equipment. As FIG. 13 shows, only a small cabinet element may be required for the control equipment. In this example embodiment, it has cable channel 52 on the front of the upper part, similar to cabinet element 11 shown in FIG. 5. Cable channel 52 also extends over the entire width of this cabinet element 16 and, with regard to height and arrangement, corresponds to cable channel 52 of cabinet element 11 in FIG. 5. As FIG. 13 also shows, control panel 58 may also be positioned on the front. Control panel 58 is part of the control modules (not shown), which are also placed into racks (also not shown).

Figure 14:
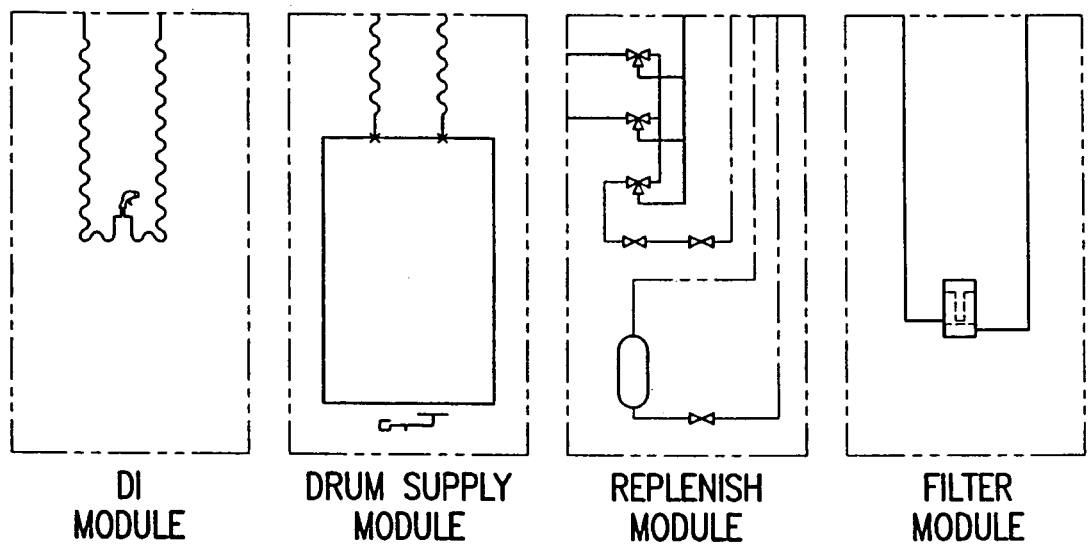
FIG. 14 shows hydraulic connecting diagrams of functional modules.
Figure 14:
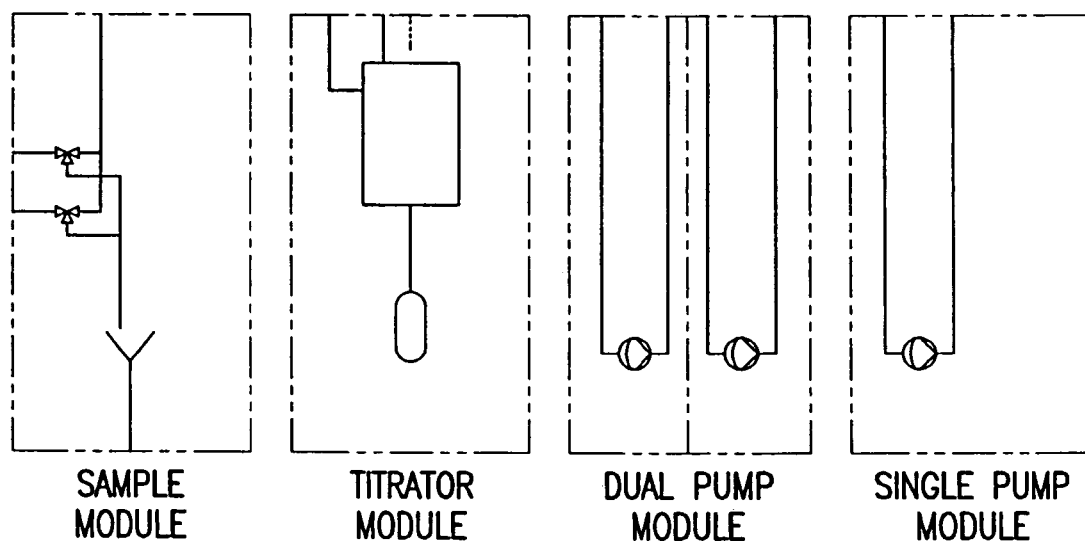

As FIG. 6 to 12 show, in compartments 21, 22 of the individual cabinet elements there are different functional modules 200, depending on the desired application. The functional module may have any size and shape that may be accommodated by a defined functional module compartment. Functional modules may be selected from defined functional modules. Examples of different functional modules available for installation into compartments 21 and 22 are shown in FIG. 14. Preferably, the defined functional modules 200 may include a maintenance module; a sample pulling module, which may contain rinse switches; an analytical module, for example, for measuring conductivity, titration and particles; a humidifier module, for example for saturating process nitrogen; a tank module, which may be used as day tank and/or supply tank module; a DI module for rinsing of, for example, discharged chemicals; a mixing module, which may contain valves or valve groups; a mixing tank module, which preferably has sensors for determining the mixing ratio; a sensor module, for example for determining flow rate, pH and/or the density of the process chemicals; a single pump module; a double pump module; a single filter module; and a double filter module.

Figure 15A:
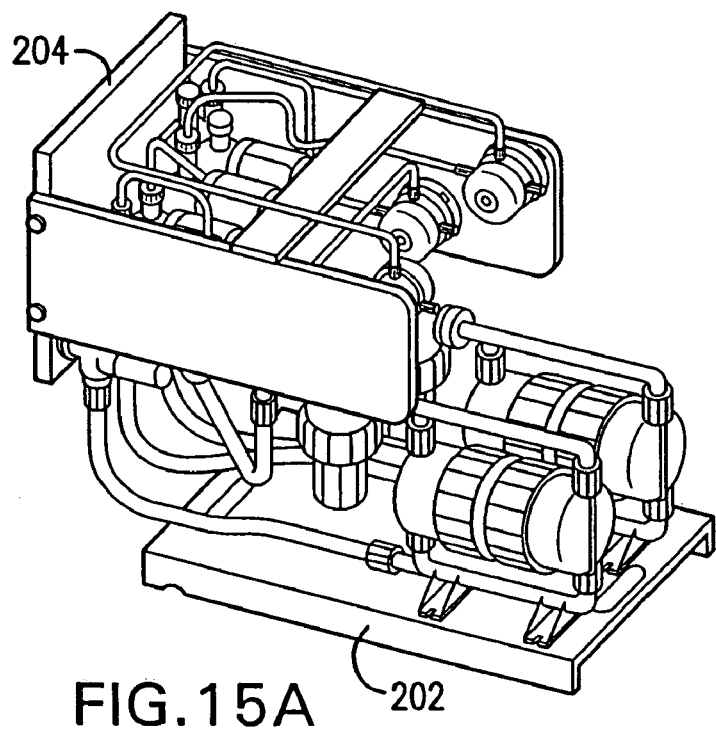
FIGS. 15a and 15b show two different functional modules in perspective representation.
Figure 15B:
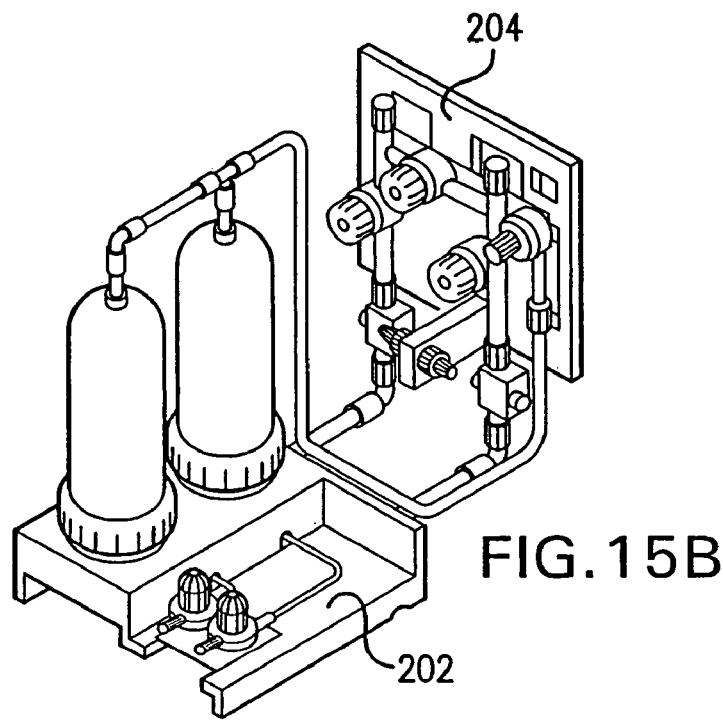

Two different functional modules are shown in FIG. 15. In the example embodiment shown, the functional module has a base plate 202 and a lateral plate 204, each carrying hydraulic components. The hydraulic components on the base plate 202 may be connected with the hydraulic components on the side plate 204 via connecting lines or tubes. The base plate 202 for the functional module shown in FIG. 15 is designed in such a way that it can be introduced or held in a rack (not shown) in the cabinet element with its side edges in rails. The side plate 204 may be fixed to one of the side walls of the cabinet element.

Figure 16A:
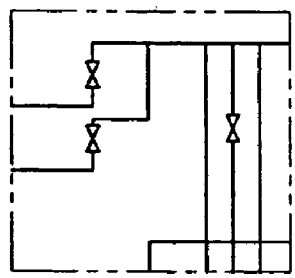
FIGS. 16a and 16b show hydraulic connection diagrams of interface modules.
Figure 16A:
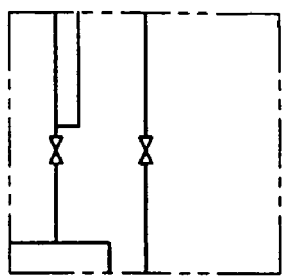
Figure 16A:
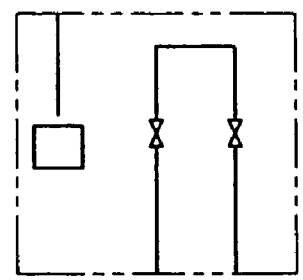
Figure 16A:
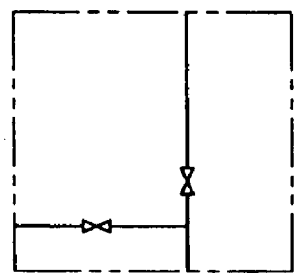
Figure 16A:
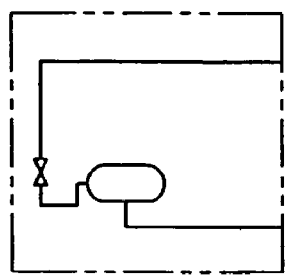
Figure 16A:
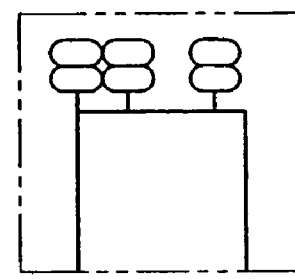
Figure 16A:
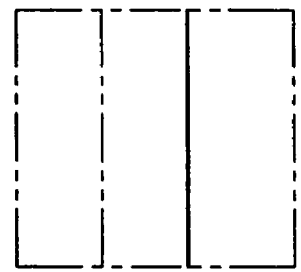
Figure 16A:
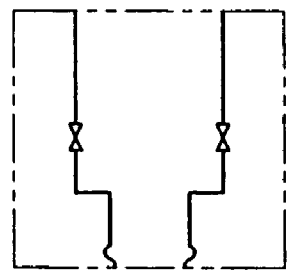
Figure 16A:
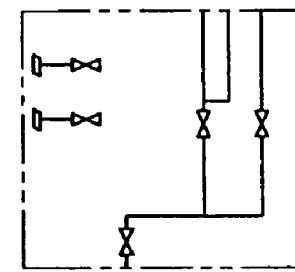
Figure 16B:
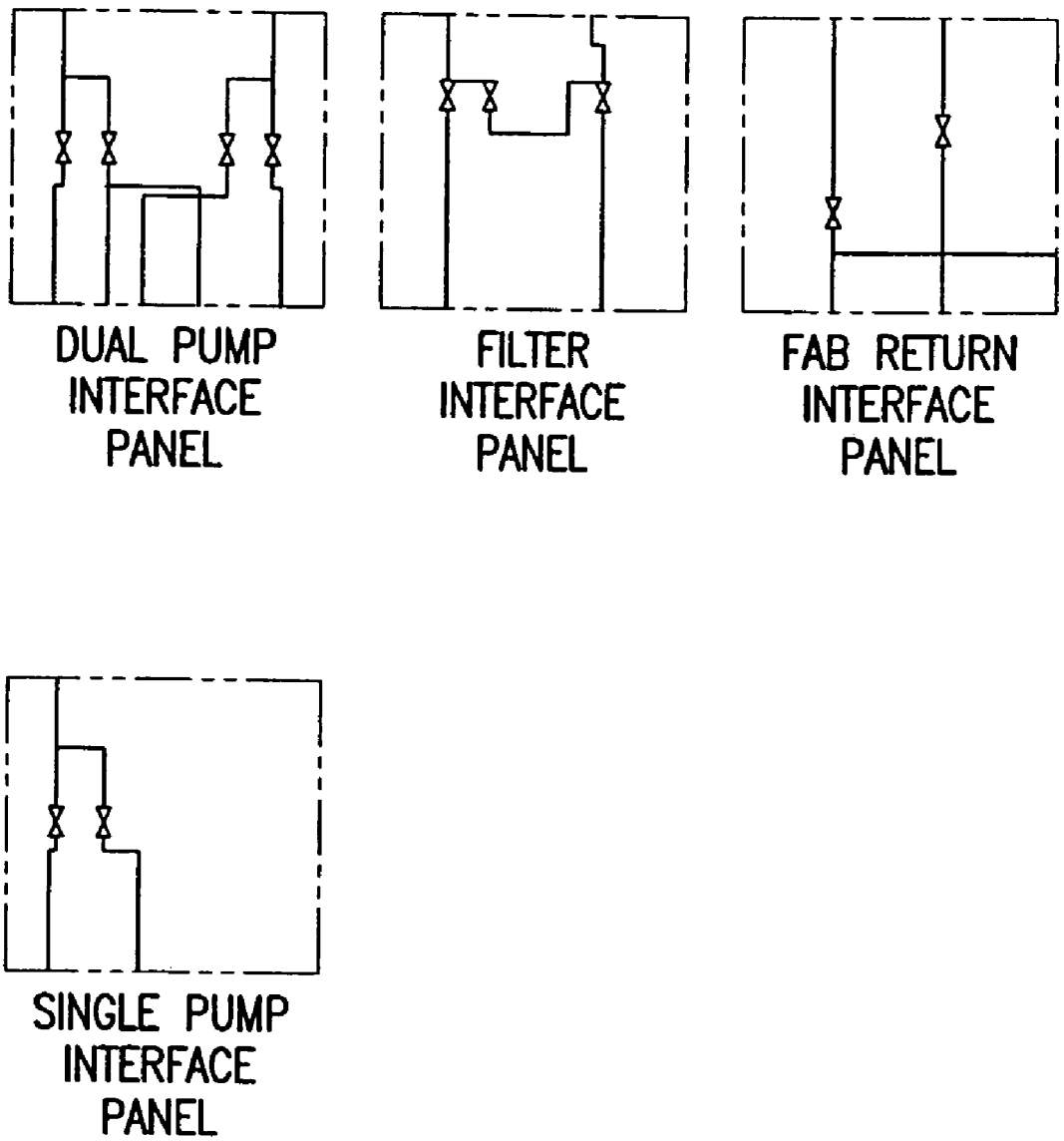

Similarly, an interface module may be selected for a particular application and housed in a defined compartment. The interface module may have any size and shape that may be accommodated by a defined interface module compartment. Different embodiments of interface modules 300, which may be housed in compartment 3 in the cabinet element are shown in FIGS. 16a and 16b. Preferably, the available defined interface modules 300 include a rinse-interface module; an analytical-interface module; a control-interface module; a FAB supply-interface module; a humidifier-interface module; a titrator-interface module; a DI interface module; a sample pulling-interface module; a double pump-interface module; a single pump interface module; a filter-interface module; and a FAB return-interface module. The interface modules are generally operatively coupled to the functional module with which they are associated.

Figure 17B:
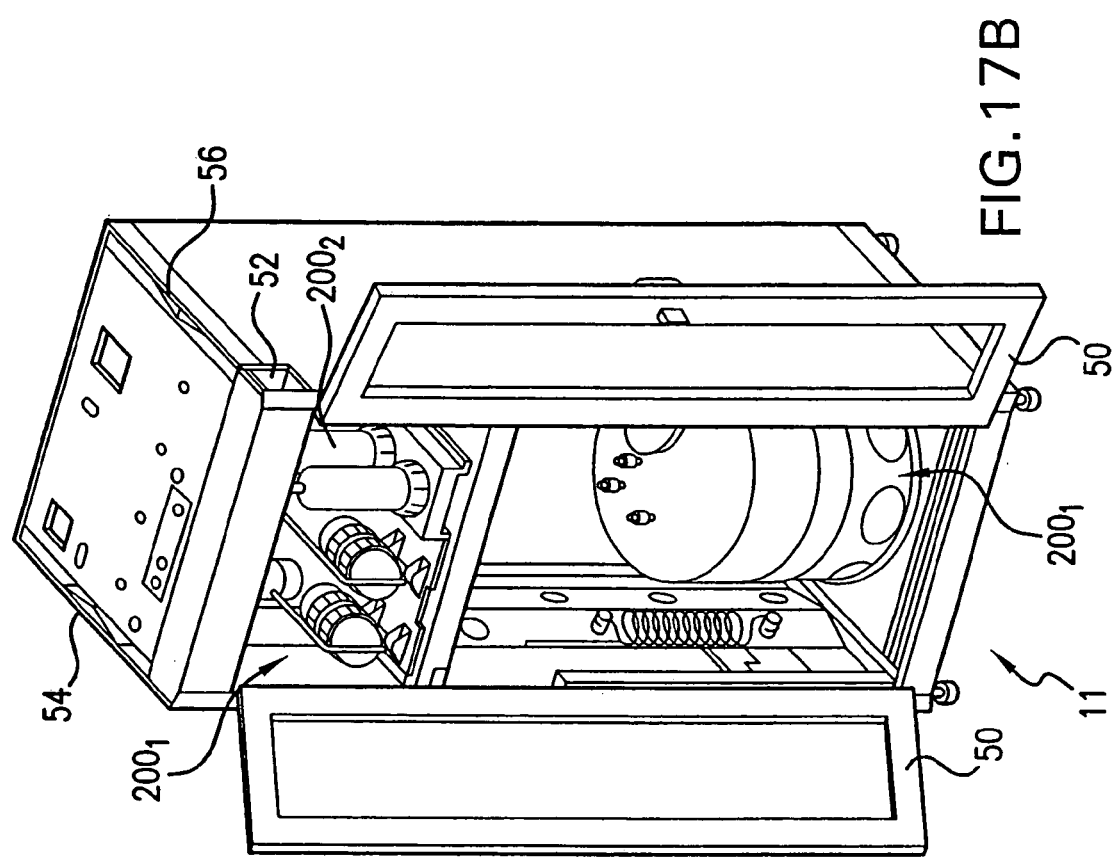
Figure 17A:
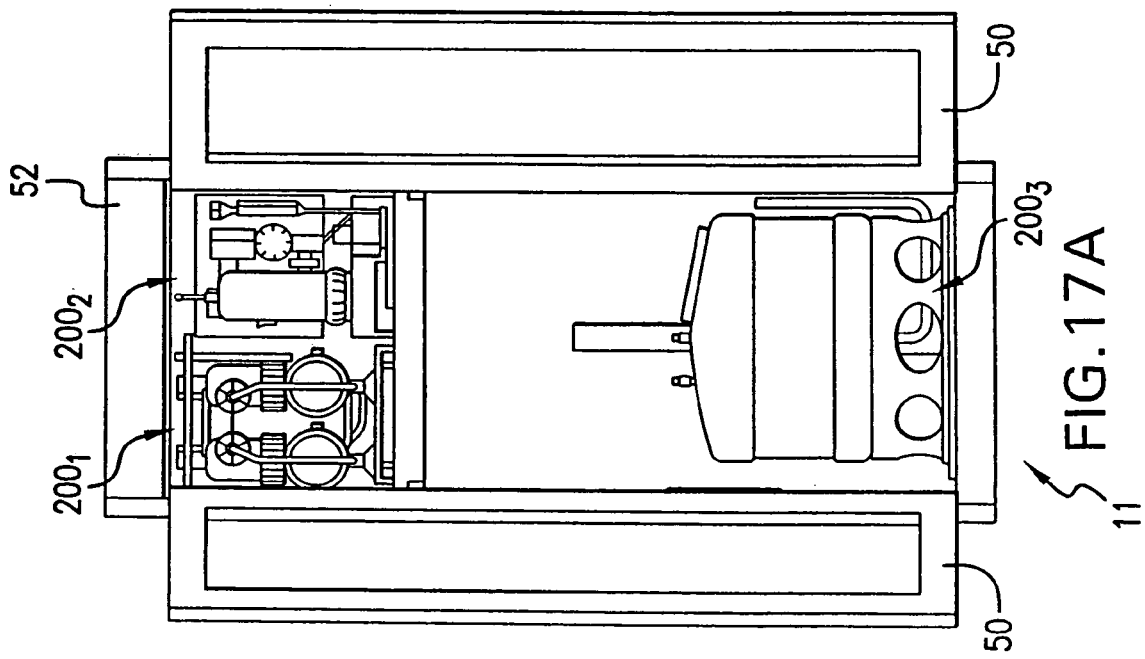
FIG. 17a is a frontal view of a cabinet element with built-in functional modules.

FIG. 17 shows a front view (a) and a perspective view (b) of the cabinet element shown in FIG. 5 with installed functional modules 200. For better viewing, the doors are open. The cabinet element 11 in FIG. 17 has a double pump module 200$_1$ and a double filter module 200$_2$, which, in the embodiment shown, are in the upper section of the cabinet element 11. FIG. 17 also illustrates a tank module 200$_3$, that is in the lower section of the cabinet element 11.

Figure 18:
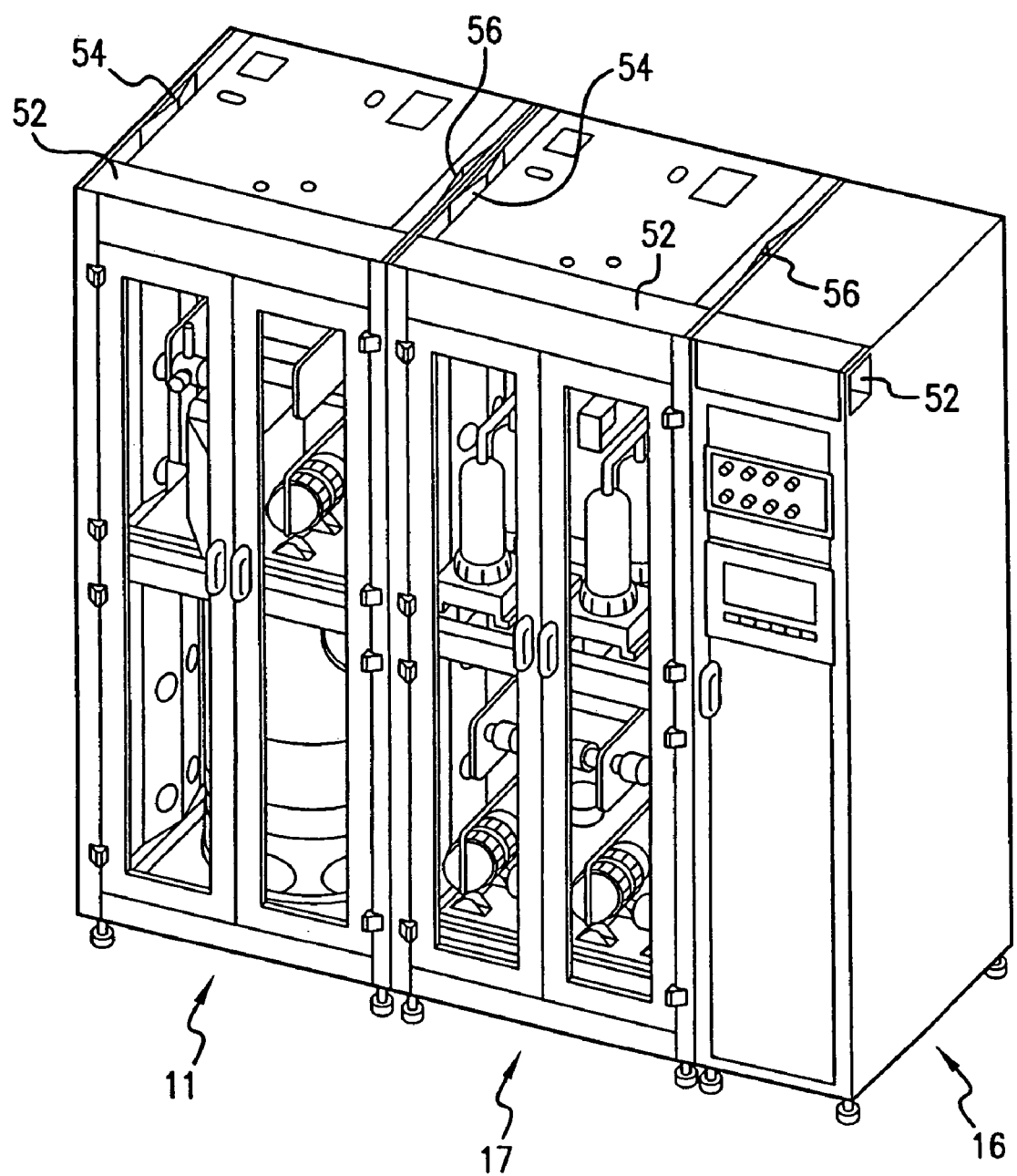
FIG. 18 is a perspective representation of an arrangement of two cabinet elements containing functional modules and an additional cabinet element containing electronic control equipment.

FIG. 18 shows the arrangement of two cabinet elements, adjacent one another and an additional cabinet element 16 with control equipment. As can be seen in FIG. 18, the cable channels 52 of the individual cabinet elements 11, 16 align with one another and thus form a continuous cable channel. Moreover, FIG. 18 also illustrates that the neighbouring aeration and ventilation channels 54, 56 of the two cabinet elements 11 are primarily located directly next to one another and thus can be easily connected using a connector (not shown).

Finally, for reasons related to completeness, it is noted that in FIGS. 1 to 4 and 6 to 12, the compartments for the corresponding components are only represented schematically, in regards to their size and arrangement, and that in the practice, the individual compartments take up more space and also have other proportions.

While several embodiments of the invention have been described and illustrated herein, those of ordinary skill in the art will readily envision a variety of other means and structures for performing the functions and/or obtaining the results or advantages described herein, and each of such variations or modifications is deemed to be within the scope of the present invention. For example, it should be appreciated that the functional modules, the interface modules, and the connecting lines may be interconnected in a well-known manner according to the needs of the desired application.

More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention.

In the claims (as well as in the specification above), all transitional phrases such as "comprising," "including," "carrying," "having," "containing," "involving," and the like are to be understood to be open-ended, i.e., to mean "including but not limited to." Only the transitional phrases "consisting of" and "consisting essentially of" shall be closed or semi-closed transitional phrases, respectively, as set forth in the United States Patent Office Manual of Patent Examining Procedures, section 2111.03.

What is claimed is:

1. A method of providing process chemicals, comprising:
providing a housing comprising a first compartment, a second compartment, and a third compartment, wherein the first compartment is constructed and arranged to removably receive a functional module, and wherein the third compartment extends to each sidewall of the housing; and
providing a functional module selected from a plurality of functional modules dimensioned to be interchangeably received within the first compartment, the plurality of functional modules including: a maintenance module; a sample drawing module; an analytical module; a humidifier module; a tank module; a DI module; a mixing module; a mixing tank module; a sensor module; a single pump module; a double pump module; a single filter module; and a double filter module.

2. The method of claim 1, wherein the housing further comprises a fourth compartment, and wherein each of the first, second, third, and fourth compartments are positioned in defined locations within the housing.

3. The method of claim 1, further comprising:
providing a second functional module selected from the group consisting of: a maintenance module; a sample drawing module; an analytical module; a humidifier module; a tank module; a DI module; a mixing module; a mixing tank module; a sensor module; a single pump module; a double pump module; a single filter module; and a double filter module; and
positioning the second functional module in another first compartment in the housing.

4. A system for providing process chemicals, comprising:
a housing comprising:
a first compartment;
a second compartment; and
a third compartment, the third compartment extending to each sidewall of the housing,
wherein the first compartment is constructed and arranged to removably receive any one of a plurality of functional modules including: a maintenance module; a sample drawing module; an analytical module; a humidifier module; a tank module; a DI module; a mixing module; a mixing tank module; a sensor module; a single pump module; a double pump module; a single filter module; and a double filter module, wherein each of the functional modules is dimensioned so as to be interchangeable with one another.

5. The system of claim 4, wherein the second compartment is constructed and arranged to removably receive a control module.

6. The system of claim 5, wherein the third compartment is constructed and arranged to removably receive at least one connecting line.

7. The system of claim 6, wherein the housing further comprises a fourth compartment constructed and arranged to individually and removably receive each of: a rinse-interface module; an analytical-interface module; a control-interface module; a FAB supply-interface module; a humidifier-interface module; a titrator-interface module; a DI interface module; a sample pulling-interface module; a double pump-interface module; a single-pump interface module; a filter-interface module; and a FAB return-interface module.

8. The system of claim 7, further comprising:
two or more first compartments identical to one another; and
two or more fourth compartments identical to one another.

9. The system of claim 7, wherein the housing is a first housing, the system further comprising a second housing comprising:
a first compartment constructed and arranged to be connected to the first compartment of the first housing;
a second compartment constructed and arranged to be connected to the second compartment of the first housing;
a third compartment constructed and arranged to be connected to the third compartment of the first housing; and
a fourth compartment constructed and arranged to be connected to the fourth compartment of the first housing.

10. The system of claim 9, wherein the first housing is identical to the second housing.

11. A system for providing process chemicals, comprising:
a first housing comprising a first compartment, a second compartment, and a third compartment;
a functional module selected from a plurality of functional modules dimensioned so as to be interchangeably received in the first compartment;
a control module received in the second compartment; and
at least one connecting line positioned in the third compartment,
wherein each of the first, second, and third compartments is positioned in a defined location in the first housing,
wherein the third compartment houses only the at least one connecting line, and
wherein a location of a module within each of the first and second compartments identifies whether the module is a functional module or a control module.

12. The system of claim 11, wherein the first compartment is constructed and arranged to individually house any of a maintenance module; a sample drawing module; an analytical module; a humidifier module; a tank module; a DI module; a mixing module; a mixing tank module; a sensor module; a single pump module; a double pump module; a single filter module; and a double filter module, each dimensioned to fit within the first compartment.

13. The system of claim 11, further comprising an interface module positioned in a fourth compartment of the first housing.

14. The system of claim 13, wherein the interface module is removably positioned in the fourth compartment.

15. The system of claim 14, wherein the fourth compartment includes a rack for removably receiving the interface module.

16. The system of claim 14, wherein the first housing comprises:
two or more first compartments each identical to one another; and
two or more fourth compartments each identical to one another.

17. The system of claim 13, wherein the at least one connecting line is a supply line.

18. The system of claim 17, further comprising at least one drain line positioned in a fifth compartment of the first housing.

19. The system of claim 18, further comprising at least one hydraulic auxiliary line positioned in a sixth compartment of the first housing.

20. The system of claim 19, further comprising at least one electrical connecting line positioned in a seventh compartment of the first housing.

21. The system of claim 11, wherein at least one of the functional module and the control module is removable.

22. The system of claim 21, wherein at least one of the first compartment and the second compartment includes a rack.

23. The system of claim 11, wherein the first housing further comprises an aeration channel and a ventilation channel.

24. The system of claim 11, further comprising a second housing positioned adjacent the first housing, wherein the second housing comprises:
a first compartment constructed and arranged to be connected to the first compartment of the first housing;
a second compartment constructed and arranged to be connected to the second compartment of the first housing; and
a third compartment constructed and arranged to be connected to the third compartment of the first housing.

25. The system of claim 24, further comprising:
a functional module positioned in the first compartment of the second housing;
a control module positioned in the second compartment of the second housing; and
at least one connecting line positioned in the third compartment of the second housing;
wherein the first compartment in the first housing has a defined location within the first housing corresponding to a defined location of the first compartment in the second housing.

26. The system of claim 25, wherein the second and third compartments of the first housing each have defined locations within the first housing corresponding to locations of the second and third compartments of the second housing.

27. The system of claim 11, further comprising a second housing for electrical control equipment.

28. The system of claim 11, wherein the control module is operatively coupled to the functional module to control operation of the functional module.

* * * * *